United States Patent
Le Roy et al.

(10) Patent No.: US 10,127,405 B2
(45) Date of Patent: Nov. 13, 2018

(54) TECHNIQUES FOR DETERMINING AN ANTI-REPLAY COUNTER FOR PREVENTING REPLAY ATTACKS

(71) Applicant: QUALCOMM Incorporated, San Diego, CA (US)

(72) Inventors: Vincent Pierre Le Roy, San Diego, CA (US); Olivier Jean Benoit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 15/180,948

(22) Filed: Jun. 13, 2016

(65) Prior Publication Data

US 2017/0329994 A1    Nov. 16, 2017

Related U.S. Application Data

(60) Provisional application No. 62/334,325, filed on May 10, 2016.

(51) Int. Cl.

| | |
|---|---|
| *G06F 21/64* | (2013.01) |
| *H04L 29/06* | (2006.01) |
| *H04L 9/32* | (2006.01) |
| *G06F 12/14* | (2006.01) |
| *G06F 21/57* | (2013.01) |
| *G06F 21/71* | (2013.01) |
| *G06F 21/72* | (2013.01) |

(52) U.S. Cl.
CPC .............. *G06F 21/64* (2013.01); *G06F 12/14* (2013.01); *G06F 21/575* (2013.01); *G06F 21/71* (2013.01); *G06F 21/72* (2013.01); *H04L 9/3242* (2013.01); *H04L 9/3247* (2013.01)

(58) Field of Classification Search
CPC ...... H04L 9/3242; H04L 9/3247; G06F 21/64
See application file for complete search history.

(56) References Cited

U.S. PATENT DOCUMENTS

| | | | |
|---|---|---|---|
| 6,925,523 B2 | 8/2005 | Engel et al. | |
| 7,526,059 B1 | 4/2009 | Shen et al. | |
| 8,184,812 B2 | 5/2012 | Margolis et al. | |
| 2008/0320263 A1 | 12/2008 | Nemiroff et al. | |
| 2010/0146279 A1* | 6/2010 | Lu | G06F 13/10 713/172 |
| 2011/0154059 A1 | 6/2011 | Durham et al. | |
| 2012/0190354 A1* | 7/2012 | Merrien | H04W 4/001 455/422.1 |

(Continued)

OTHER PUBLICATIONS

International Search Report and Written Opinion—PCT/US2017/021292—ISA/EPO—dated Jun. 30, 2017.

*Primary Examiner* — Amir Mehrmanesh
(74) *Attorney, Agent, or Firm* — Jae-Hee Choi; Hunter Clark

(57) ABSTRACT

Techniques for maintaining an anti-replay counter (ARC) for providing data protection in an integrated circuit are provided. A method according to these techniques includes determining a static baseline value based on an ARC value stored in a programmable read-only memory of the integrated circuit, determining the ARC value based on the static baseline value and a transient component, and storing the ARC value in a volatile memory of the integrated circuit.

27 Claims, 11 Drawing Sheets

(56) References Cited

U.S. PATENT DOCUMENTS

| | | | |
|---|---|---|---|
| 2013/0136145 A1* | 5/2013 | Bi | H04L 69/22 370/475 |
| 2014/0068722 A1* | 3/2014 | Hayat | G06Q 20/02 726/4 |
| 2015/0082380 A1* | 3/2015 | Nairn | H04L 63/126 726/2 |
| 2016/0026783 A1 | 1/2016 | Buer et al. | |
| 2017/0364689 A1* | 12/2017 | Pappachan | G06F 21/602 |

* cited by examiner

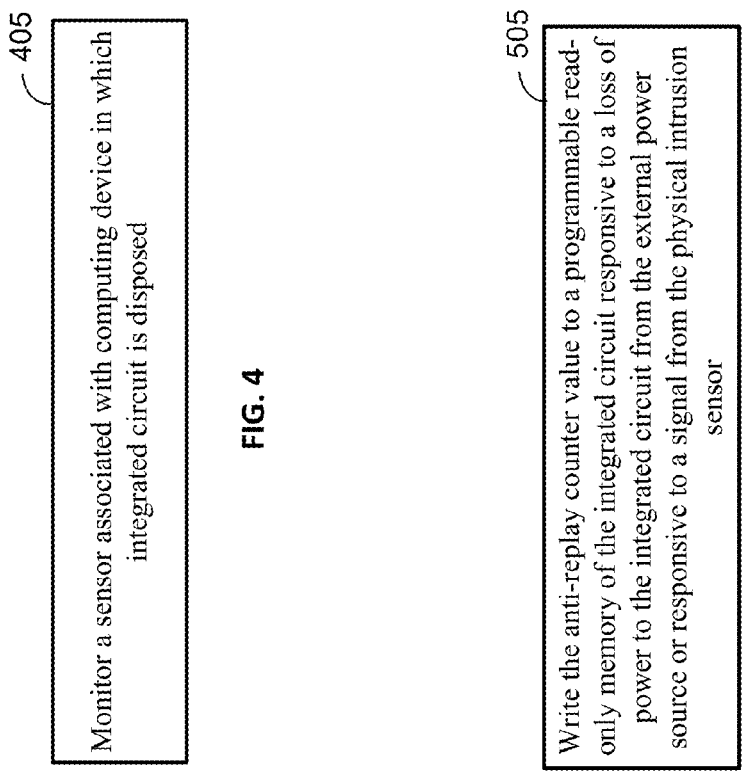
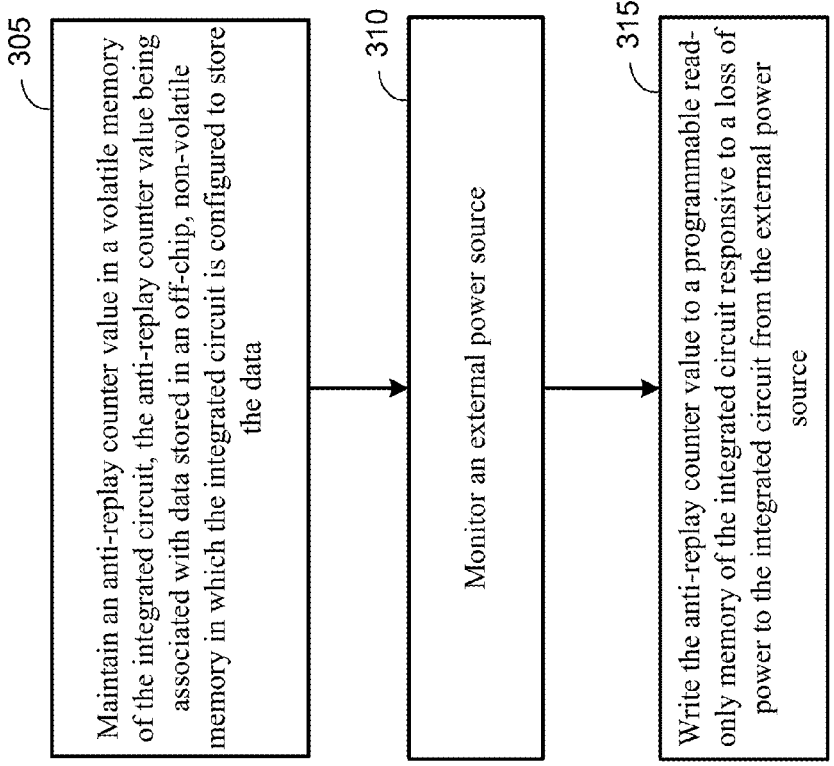

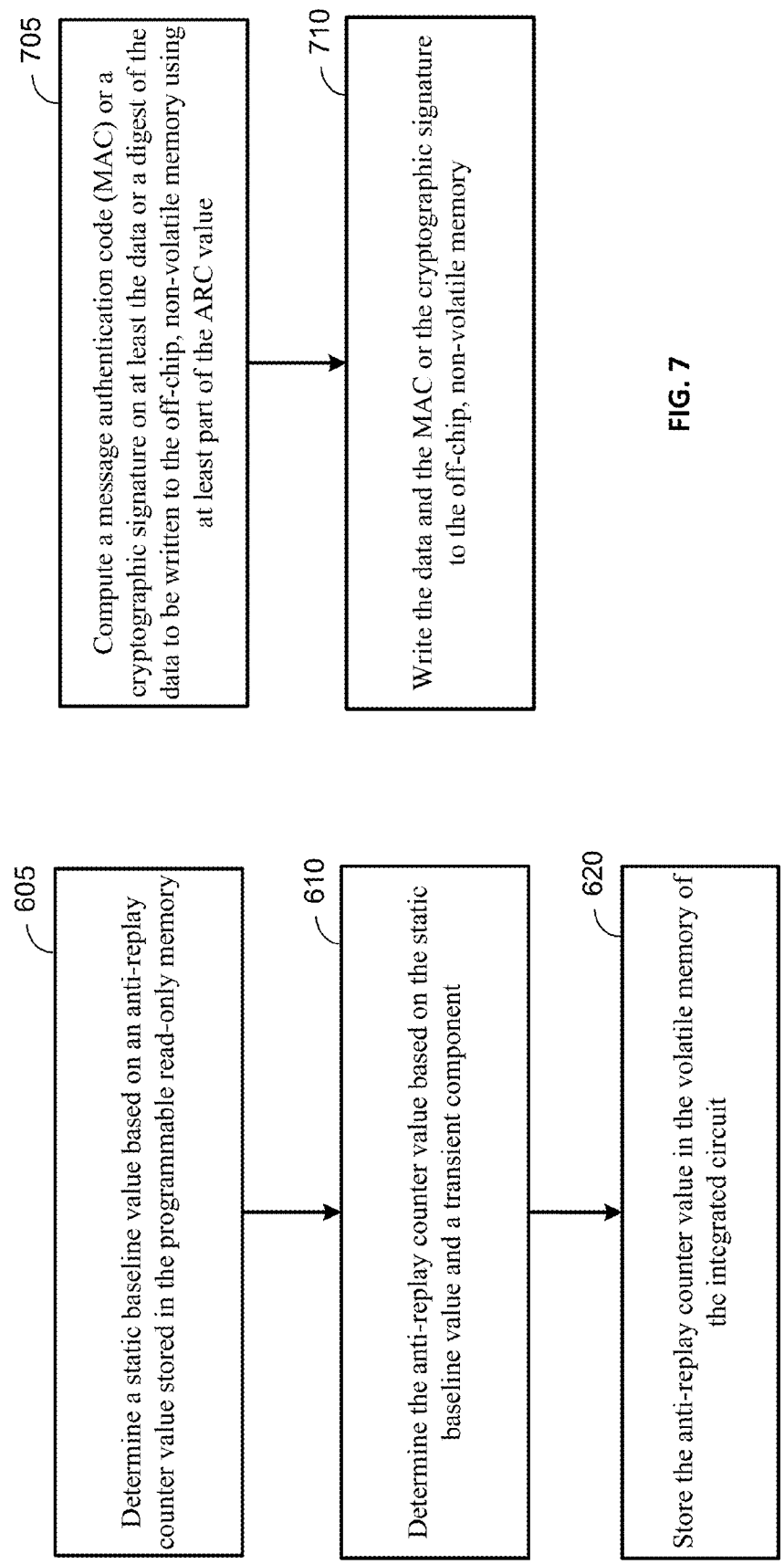

TECHNIQUES FOR DETERMINING AN ANTI-REPLAY COUNTER FOR PREVENTING REPLAY ATTACKS

CROSS REFERENCE TO RELATED APPLICATION

This application claims priority to U.S. Provisional Patent Application Ser. No. 62/334,325, entitled "TECHNIQUES FOR DETERMINING AN ANTI-REPLAY COUNTER FOR PREVENTING REPLAY ATTACKS," filed on May 10, 2016, all of which are assigned to the assignee hereof and incorporated by reference.

BACKGROUND

Data security is a critical issue for many computing devices. Computing devices can include secure processing subsystem that may be implemented as a secure area of a processor of the computing device or may include a separate processor and memory that can be used to store data. The secure processing subsystem may be implemented as a system-on-a-chip (SoC) or other similar device that includes a processor element and memory implemented on an integrated circuit. However, the amount of memory available on the integrated circuit may be limited and an external non-volatile memory (NVM) may be used to store data used by the secure processing subsystem. Confidentiality of the data stored in the NVM can be ensured through the use of encryption, and the integrity of the data stored in the NVM can be ensured through the use of digital signatures. However, an attacker may attempt to restore an old copy of the data to the NVM which is validly signed and/or encrypted by the secure processing system in what is referred to as a rollback or replay attack. Accordingly, additional protections are required for data stored in an NVM.

SUMMARY

An example method providing data protection in an integrated circuit according to the disclosure includes determining a static baseline value based on an anti-replay counter (ARC) value stored in a programmable read-only memory of the integrated circuit, determining the ARC value based on the static baseline value and a transient component, and storing the ARC value in a volatile memory of the integrated circuit.

Implementations of such a method may include one or more of the following features. Redetermining the transient component each time that data is to be written to off-chip, non-volatile memory by the integrated circuit. Updating the ARC value stored in the programmable read-only memory based on the ARC value in the volatile memory responsive to a power loss event. The power loss event comprises loss of power to the integrated circuit from an external power source or a signal from a sensor indicative that the external power source may be or is about to be removed. Determining the static baseline value based on the ARC value stored in the programmable read-only memory includes accessing the ARC value stored in the programmable read-only memory, the ARC value being stored as a pattern of bits in the programmable read-only memory, selecting at least one bit from the programmable read-only memory that is not included in the pattern of bits, setting a value of the at least one bit selected in the programmable read-only memory, and determining the static baseline value based on the ARC value stored in the programmable read-only memory and the at least one bit selected. Selecting the at least one bit from the programmable read-only memory that is not included in the pattern of bits includes randomly selecting the at least one bit. Determining the transient component, wherein determining the transient component includes randomly selecting at least one bit of the programmable read-only memory not included in the static baseline value, and setting a value of the at least one bit that was randomly selected. Determining the transient component, wherein determining the transient component includes selecting a set of bits from the programmable read-only memory that is not included in the static baseline value and not previously selected as the transient component, such that a number of bits comprising the set of bits is a minimum number of bits that can be selected, and setting a value of the at least one bit that was selected. Computing a message authentication code (MAC) or a cryptographic signature on at least the data or a digest of the data to be written to the off-chip, non-volatile memory using at least part of the ARC value, and writing the data and the MAC or the cryptographic signature to the off-chip, non-volatile memory.

An example integrated circuit according to the disclosure includes means for determining a static baseline value based on an anti-replay counter (ARC) value stored in a programmable read-only memory of the integrated circuit, means for determining the ARC value based on the static baseline value and a transient component, and means for storing the ARC value in a volatile memory of the integrated circuit.

Implementations of such an integrated circuit can include one or more of the following features. Means for redetermining the transient component each time that data is to be written to off-chip, non-volatile memory by the integrated circuit. Means for updating the ARC value stored in the programmable read-only memory based on the ARC value in the volatile memory responsive to a power loss event. The power loss event comprises loss of power to the integrated circuit from an external power source or a signal from a sensor indicative that the external power source may be or is about to be removed. The means for determining the static baseline value based on the ARC value stored in the programmable read-only memory includes means for accessing the ARC value stored in the programmable read-only memory, the ARC value being stored as a pattern of bits in the programmable read-only memory, means for selecting at least one bit from the programmable read-only memory that is not included in the pattern of bits, means for setting a value of the at least one bit selected in the programmable read-only memory, and means for determining the static baseline value based on the ARC value stored in the programmable read-only memory and the at least one bit selected. The means for selecting the at least one bit from the programmable read-only memory that is not included in the pattern of bits includes means for randomly selecting the at least one bit. Means for determining the transient component, wherein the means for determining the transient component includes means for randomly selecting at least one bit of the programmable read-only memory not included in the static baseline value, and means for setting a value of the at least one bit that was randomly selected. Means for determining the transient component, wherein the means for determining the transient component includes means for selecting a set of bits from the programmable read-only memory that is not included in the static baseline value and not previously selected as the transient component, such that a number of bits comprising the set of bits is a minimum number of bits that can be selected, and means for setting a value of the at least one bit that was selected. Means for computing a message authentication code (MAC) or a cryptographic signature on at least the data or a digest of the data to be written to the off-chip, non-volatile memory using at least part of the ARC value, and means for writing the data and the MAC or the cryptographic signature to the off-chip, non-volatile memory.

An example integrated circuit according to the disclosure includes a volatile memory, a programmable read-only memory, and a processor coupled to the volatile read-only memory and the programmable read-only memory. The processor is configured to determine a static baseline value based on an anti-replay counter (ARC) value stored in the programmable read-only memory of the integrated circuit, determine the ARC value based on the static baseline value and a transient component, and store the ARC value in the volatile memory of the integrated circuit.

Implementations of such an integrated circuit can include one or more of the following features. The processor is configured to redetermine the transient component each time that data is to be written to off-chip, non-volatile memory by the integrated circuit. The processor is further configured to update the ARC value stored in the programmable read-only memory based on the ARC value in the volatile memory responsive to a power loss event. The power loss event comprises loss of power to the integrated circuit from an external power source or a signal from a sensor indicative that the external power source may be or is about to be removed. The processor being configured to determine the static baseline value based on the ARC value stored in the programmable read-only memory is further configured to access the ARC value stored in the programmable read-only memory, the ARC value being stored as a pattern of bits in the programmable read-only memory, select at least one bit from the programmable read-only memory that is not included in the pattern of bits, set a value of the at least one bit selected in the programmable read-only memory, and determine the static baseline value based on the ARC value stored in the programmable read-only memory and the at least one bit selected. The processor being configured to select the at least one bit from the programmable read-only memory that is not included in the pattern of bits is configured to randomly select the at least one bit. The processor is further configured to determine the transient component, wherein the processor is configured to randomly select at least one bit of the programmable read-only memory not included in the static baseline value, and set a value of the at least one bit that was randomly selected. The processor is further configured to determine the transient component, and wherein the processor is configured to select a set of bits from the programmable read-only memory that is not included in the static baseline value and not previously selected as the transient component, such that a number of bits comprising the set of bits is a minimum number of bits that can be selected, and set a value of the at least one bit that was selected. The processor is further configured to compute a message authentication code (MAC) or a cryptographic signature on at least the data or a digest of the data to be written to the off-chip, non-volatile memory using at least part of the ARC value, and writing the data and the MAC or the cryptographic signature to the off-chip, non-volatile memory.

An example non-transitory, computer-readable medium, having stored thereon computer-readable instructions for providing data protection in an integrated circuit. The instructions are configured to cause a computer to determine a static baseline value based on an anti-replay counter (ARC) value stored in a programmable read-only memory of the integrated circuit, determine the ARC value based on the static baseline value and a transient component, and store the ARC value in a volatile memory of the integrated circuit.

Implementations of such a non-transitory, computer-readable medium can include one or more of the following features. Instructions configured to cause the computer to redetermine the transient component each time that data is to be written to off-chip, non-volatile memory by the integrated circuit. Instructions configured to cause the computer to update the ARC value stored in the programmable read-only memory based on the ARC value in the volatile memory responsive to a power loss event. The power loss event comprises loss of power to the integrated circuit from an external power source or a signal from a sensor indicative that the external power source may be or is about to be removed. The instructions configured to cause the computer to determine the static baseline value based on the ARC value stored in the programmable read-only memory is further comprise instructions configured to cause the computer to access the ARC value stored in the programmable read-only memory, the ARC value being stored as a pattern of bits in the programmable read-only memory, select at least one bit from the programmable read-only memory that is not included in the pattern of bits, set a value of the at least one bit selected in the programmable read-only memory, and determine the static baseline value based on the ARC value stored in the programmable read-only memory and the at least one bit selected. The instructions configured to cause the computer to select the at least one bit from the programmable read-only memory that is not included in the pattern of bits include instructions configured to cause the computer to randomly select the at least one bit. Instructions configured to cause the computer to determine the transient component, the instructions including instructions configured to cause the computer to randomly select at least one bit of the programmable read-only memory not included in the static baseline value and set a value of the at least one bit that was randomly selected. Instructions configured to cause the computer to determine the transient component, the instructions including instructions configured to cause the computer to select a set of bits from the programmable read-only memory that is not included in the static baseline value and not previously selected as the transient component, such that a number of bits comprising the set of bits is a minimum number of bits that can be selected, and set a value of the at least one bit that was selected. Instructions configured to cause the computer to compute a message authentication code (MAC) or a cryptographic signature on at least the data or a digest of the data to be written to the off-chip, non-volatile memory using at least part of the ARC value; and write the data and the MAC or the cryptographic signature to the off-chip, non-volatile memory.

BRIEF DESCRIPTION OF THE DRAWINGS

FIG. 3 is a flow diagram of an example process for providing data protection in an integrated circuit according to the techniques disclosed herein.

FIG. 4 is a flow diagram of an example process for maintaining an anti-replay counter according to the techniques disclosed herein that can be used to implement at least in part the process illustrated in FIG. 3.

FIG. 5 is a flow diagram of an example process for maintaining an anti-replay counter according to the techniques disclosed herein that can be used to implement at least in part the process illustrated in FIG. 3.

FIG. 6 is a flow diagram of an example process for determining an anti-replay counter according to the techniques disclosed herein that can be used to implement at least in part the process illustrated in FIG. 3.

FIG. 7 is a flow diagram of an example process for storing data in a non-volatile memory according to the techniques disclosed herein that can be used to implement at least in part the process illustrated in FIG. 3.

DETAILED DESCRIPTION

Techniques disclosed herein are configured to provide for a fuse-based anti-replay mechanism. The fuse-based anti-replay techniques disclosed herein can be used to maintain an anti-replay counter (ARC) that can be used to prevent replay attacks on data stored in an off-chip non-volatile memory by an integrated circuit, such as a system on a chip (SoC). The ARC value can be maintained in a volatile memory of the integrated circuit, but the ARC value can be written to fuses of a one-time programmable memory of the integrated circuit responsive to an event indicative that power provided from an external power source that is disposed off of the integrated circuit has been lost or such a power loss is imminent. Loss of power to the integrated circuit can render the off-chip non-volatile memory inaccessible to the integrated circuit. Storing the ARC in the one-time programmable memory ensures that the ARC value persists should power to the volatile memory of the integrated circuit be lost. The techniques disclosed herein provide a mechanism for maintaining the ARC value that does not require that all or a portion of the ARC value be stored in the off-chip non-volatile memory by storing the ARC in the one-time programmable memory. The techniques disclosed herein can be used to provide data confidentiality, through encryption or other means, and data integrity, through the use of message authentication or other means. The following example embodiments illustrate these concepts.

Figure 1:
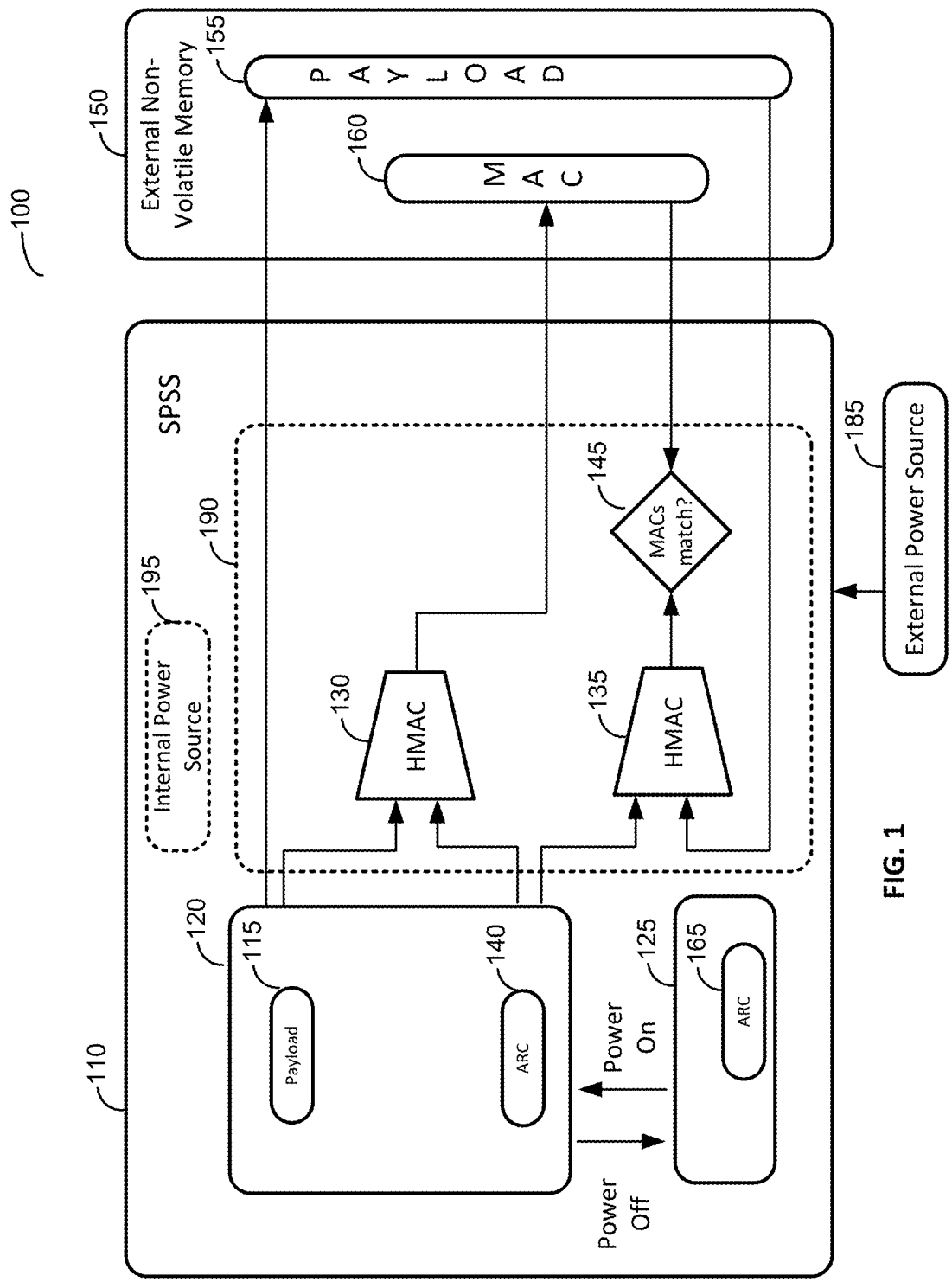
FIG. 1 is a functional block diagram of an example computer system illustrating the technique disclosed herein.

FIG. 1 is a functional block diagram of an example computing device 100 illustrating the techniques disclosed herein. The computing device 100 comprises a secure processing subsystem 110 and a non-volatile memory (NVM) 150 external to the secure processing subsystem 110 that can be used by the secure processing subsystem 110 to store data. The secure processing subsystem 110 may be implemented on an integrated circuit and the external NVM 150 may be implemented as an off-chip memory that is not implemented on the integrated circuit on which the secure processing subsystem 110. The secure processing subsystem 110 can provide a secure execution environment for processor-executable program code and for secure data storage that can prevent unauthorized access to the data stored therein and/or prevent unauthorized execution of processor-executable program instructions by a processor of the secure processing subsystem 110.

The secure processing subsystem 110 can include a processor 190 that can implement the various functions and functional elements discussed herein with regard to the secure processing subsystem 110. For example, the following functional elements: HMAC block 130, HMAC block 135, and/or the matching block 145, can be implemented by a processor 190 of the secure processing subsystem 110. The secure processing subsystem can also be implemented by a general purpose processor of the computing device 100, which can be configured to segregate secure processing resources and memory from general processing resources and memory for non-secure applications. Furthermore, the secure processing subsystem 110 can be configured to generate a cryptographic signature of on at least a part of the data or a digest of the data to be written to the external NVM 150. For example, the processor 190 of the secure processing subsystem 110 can be configured to generate a hash of at least part of the data or a digest of the data and to encrypt the hash or digest of the data. The encrypted hash may be stored in the external NVM 150 with the data instead of or in addition to the MAC 160.

The secure processing subsystem 110 can include a volatile memory 120 and a nonvolatile memory, such as a one-time programmable memory 125. The volatile memory 120 can comprise memory that is configured to maintain the data stored therein while power is provided to the volatile memory 120. The contents of the volatile memory 120 will be lost if the power supply to the secure processing subsystem 110 is lost. The one-time programmable memory 125 comprises a persistent memory that retains the data stored therein even if power to the secure processing subsystem 110 is lost. The one-time programmable memory 125 can comprise a plurality of fuses that each represent a bit of data, and the value of a particular bit can be set by blowing the corresponding fuse. The value of a fuse, once set, cannot be changed. The value of the fuse in its original state may be used to represent a bit value of zero ('0'), and the value of the fuse once blown may be used to represent a bit value of one ('1'). In other embodiments, the value of the fuse in its original state may be used to represent a bit value of one ('1'), and the value of the fuse once blown may be used to represent a bit value of one ('0'). Furthermore, other types of one-time programmable memory 125 may be used. For example, the one-time programmable memory 125 may comprise anti-fuses instead of fuses.

The secure processing subsystem 110 may include an internal power source 195. The internal power source can be used as a secondary power source that can provide power to the secure processing subsystem in the event that power from the external power source 185 is lost. The internal power source 195 can comprise a capacitor, a battery, or other device that can store electrical power that can power the secure processing subsystem 110 for at least a short period of time in the event that power from the external power source 185 is lost. The internal power source 195 can be configured to provide the secure processing subsystem 110 with sufficient power to allow the secure processing subsystem 110 to write the current anti-replay counter (ARC) value 140 stored in the volatile memory 120 to the one-time programmable memory 125 so that the ARC value is not lost due to the device losing power.

The external power source 185 may comprise a battery or other device that can provide electrical power to the components of the computing device 100. The external power source 185 is separate from the secure processing subsystem 110 and may be removable from the computing device. The computing device 100 may include a sensor (not shown in FIG. 1) that can provide a signal to the secure processing subsystem 110 responsive to the sensor detecting a physical intrusion of the computing device. The external power source 185 may comprise a removable battery or other power source that could be removed by a user of the computing device 100 and swapped for another external power source 185. For example, the user of the computing device 100 may swap the external power source 185 for another external power source 185 as the power source is depleted or the user of the device may wish to force the computing device 100 to reboot.

The secure processing subsystem can be configured to store an anti-replay counter (ARC) value, referred to as ARC value 165, in the one-time programmable memory 125 responsive to the power from the outside power source being lost or the external power source 185 reaching a predetermined threshold. Other events can also trigger the processor 190 of the secure processing subsystem to store the ARC value 140 from the non-volatile memory in the one-time programmable memory 125 as ARC value 165. These events include, but are not limited to: (1) the secure processing subsystem making a determination that a remaining power level of the external power source 185 has reached a predetermined threshold indicating that power from the external power source 185 may be lost soon, (2) the computing device 100 is being shut down or rebooted and the ARC value 140 from the non-volatile memory will be lost if not written to the one-time programmable memory 125 as ARC value 165, or (3) the secure processing subsystem 110 receives a signal from a sensor of the computing device 100 which may indicate that the battery or other external power source may be removed from the computing device 100.

The secure processing subsystem 110 of the computing device 100 can use the ARC value to prevent replay attacks in which an attacker attempts to place data expired but otherwise valid data in the external NVM 150 in an attempt to gain access to the secure processing subsystem 110 or to have the secure processing subsystem perform some unauthorized action. To avoid replay attacks, the secure processing subsystem relies on the ARC. The secure processing subsystem can generate data, referred to herein as payload data 115, in the volatile memory 120 of the secure processing subsystem 110. However, the amount of non-volatile memory available as on-chip memory of the integrated circuit is typically limited by size and cost constraints, and the secure processing subsystem 110 may need to offload the payload data 115 to the external NVM 150 to free up memory for additional processing task. The secure processing subsystem 110 may offload the payload data 115 to the external NVM 150 that may be required later and can be written to the external NVM 150 for persistent storage since the size of one-time programmable memory 125 is generally limited and each bit of the one-time programmable memory 125 can only be written to once.

At the time that the computing device 100 is powered on, the processor 190 of the secure processing subsystem 110 can retrieve the ARC value 165 from the one-time programmable memory 125 and store the ARC value 140 in the volatile memory 120. The ARC value 140 can be maintained in the volatile memory 120 until a triggering event occurs that causes the processor 190 of the secure processing subsystem 110 to update the ARC value 165 in the one-time programmable memory with the current value of the ARC value 140 stored in the volatile memory 120. A triggering event is an event which indicates that the external power supply to the secure processing subsystem 110 may be or has been lost, and thus, the contents of the volatile memory 120 will be lost unless backed up. Maintaining the ARC value in the volatile memory 120 until such a triggering event occurs allows the secure processing subsystem 110 to significantly reduce the number of fuses that would be required to maintain the ARC counter. The ARC value 140 is updated each time that data is written to the external NVM 150. If the ARC counter were maintained in the one-time programmable memory 125, at least one fuse would need to be blown each time a write event to the NVM occurred. The number of fuses comprising the one-time programmable memory 125 is typically relatively small due to the size and cost considerations for fabricating the integrated circuit on which the secure processing subsystem 110 is implemented. The fuses of the one-time programmable memory 125 would be quickly exhausted, leaving the secure processing subsystem 110 with no on-chip storage for securely storing the ARC values in a persistent memory that would not be lost when the computing device 100 is powered down or rebooted.

The ARC value 140 can be used by the secure processing subsystem 110 to generate a message authentication code (MAC) 160 that can be written to the external NVM 150 with the payload data 155 to be stored therein which can be used to determine whether the payload data 155 has been modified since the MAC 160 has been calculated. The HMAC block 130 can be configured to apply a keyed-hash message authentication code (HMAC) algorithm to the payload data 115 stored in the volatile memory 120 which is to be written to the external NVM 150. The HMAC block 130 can use at least a portion of the ARC value as a key parameter for the HMAC algorithm. The secure processing subsystem 110 may have encrypted or otherwise processed the payload data 115 prior to the calculating the MAC 160. The secure processing subsystem 110 can be configured to write the MAC 160 and the payload data 155 to the external NVM 150. The secure processing subsystem 110 can be configured to communicate with the external NVM 150 via a bus or other communication pathway of the computing device 100. The secure processing subsystem 110 can be configured to later retrieve the payload data 155 and the MAC 160 from the external NVM 150. The HMAC block 135 can receive the payload data 155 and the current value of the ARC value 140 from the volatile memory 120 and recalculate the MAC for the payload data 155 based on the current anti-replay counter value. The matching block 145 can then compare the newly calculated MAC value with the MAC 160. If the MAC 160 matches the newly calculate MAC value, the payload data 155 has not been modified nor has there been a replay attack in which expired payload data and an expired MAC were inserted in the external NVM 150. If the MAC 160 does not match the newly calculate MAC value, the payload data 155 has been modified or corrupted or there has there been a replay attack in which expired payload data and/or an expired MAC were inserted in the external NVM 150. The MAC 160 associated with the expired payload data would not match the MAC recalculated by the HMAC block 135 because the ARC value 140 stored in the volatile memory 120 is updated each time that data is written to the external NVM 150. The ARC value 140 would have been incremented one or more times since the MAC 160 was determined for the payload data 155, thus the newly determined MAC based on the current value of the ARC value 140 would not match the MAC 160.

The functionality of the HMAC block 130, the HMAC block 135, and the matching block 145 can be implemented in hardware of the secure processing subsystem, or may be implemented as processor executable code that is executed by the processor 190 of the secure processing subsystem 110.

Figure 9:
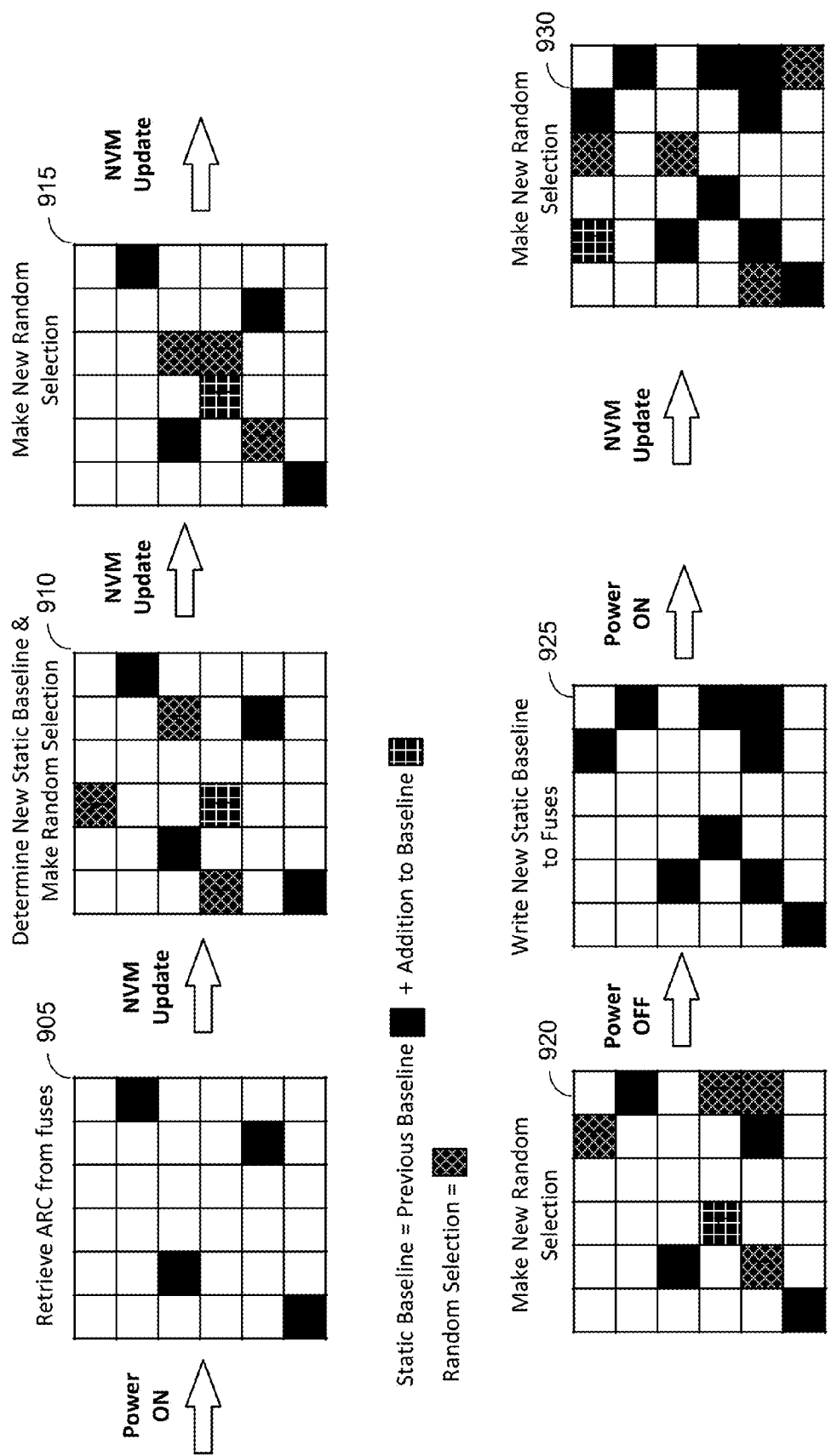
FIG. 9 is a diagram illustrating a nonce-based technique for maintaining an anti-replay counter according to the techniques disclosed herein.
Figure 10:
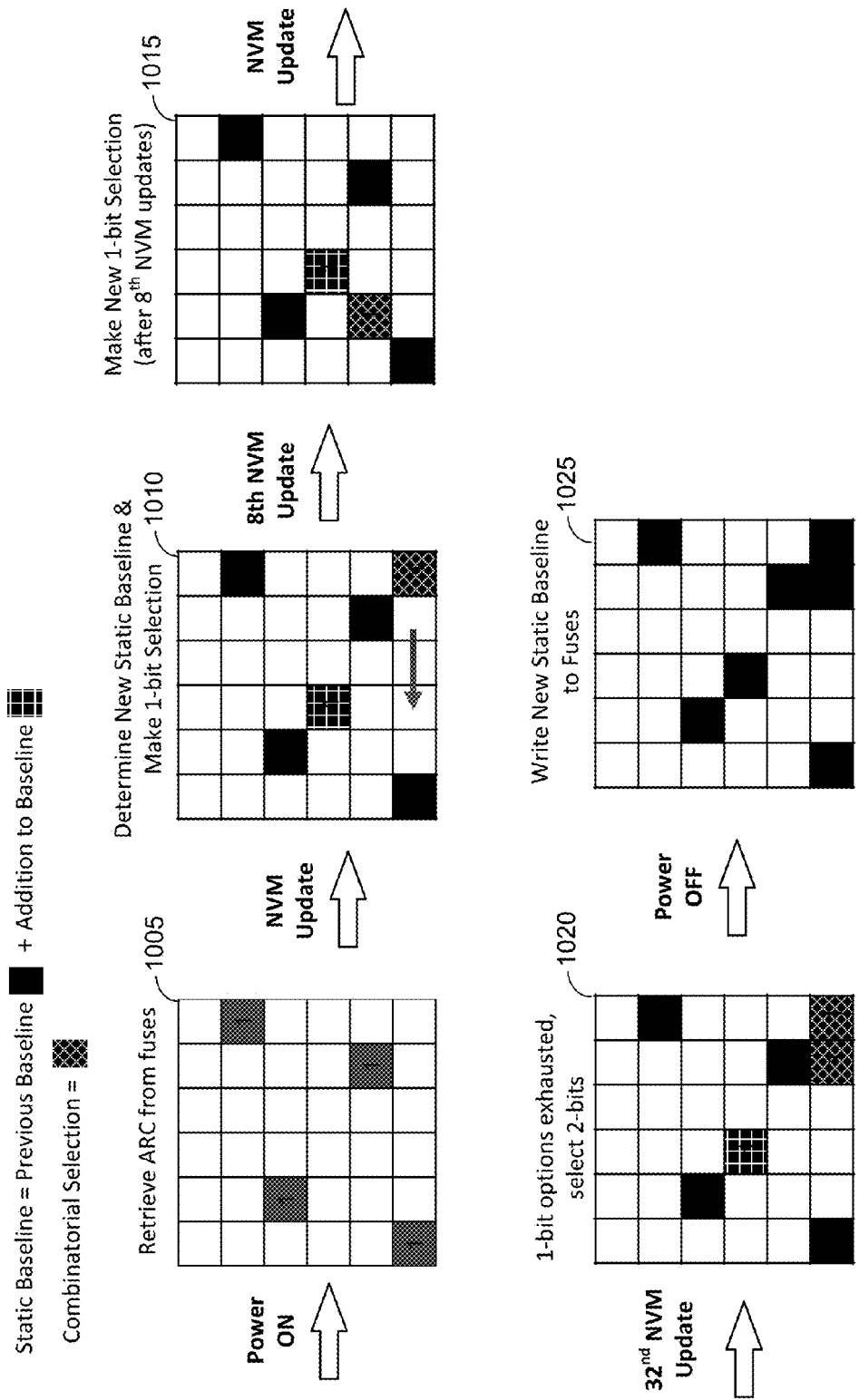
FIG. 10 is a diagram illustrating another technique for maintaining an anti-replay counter according to the techniques disclosed herein.
Figure 11:
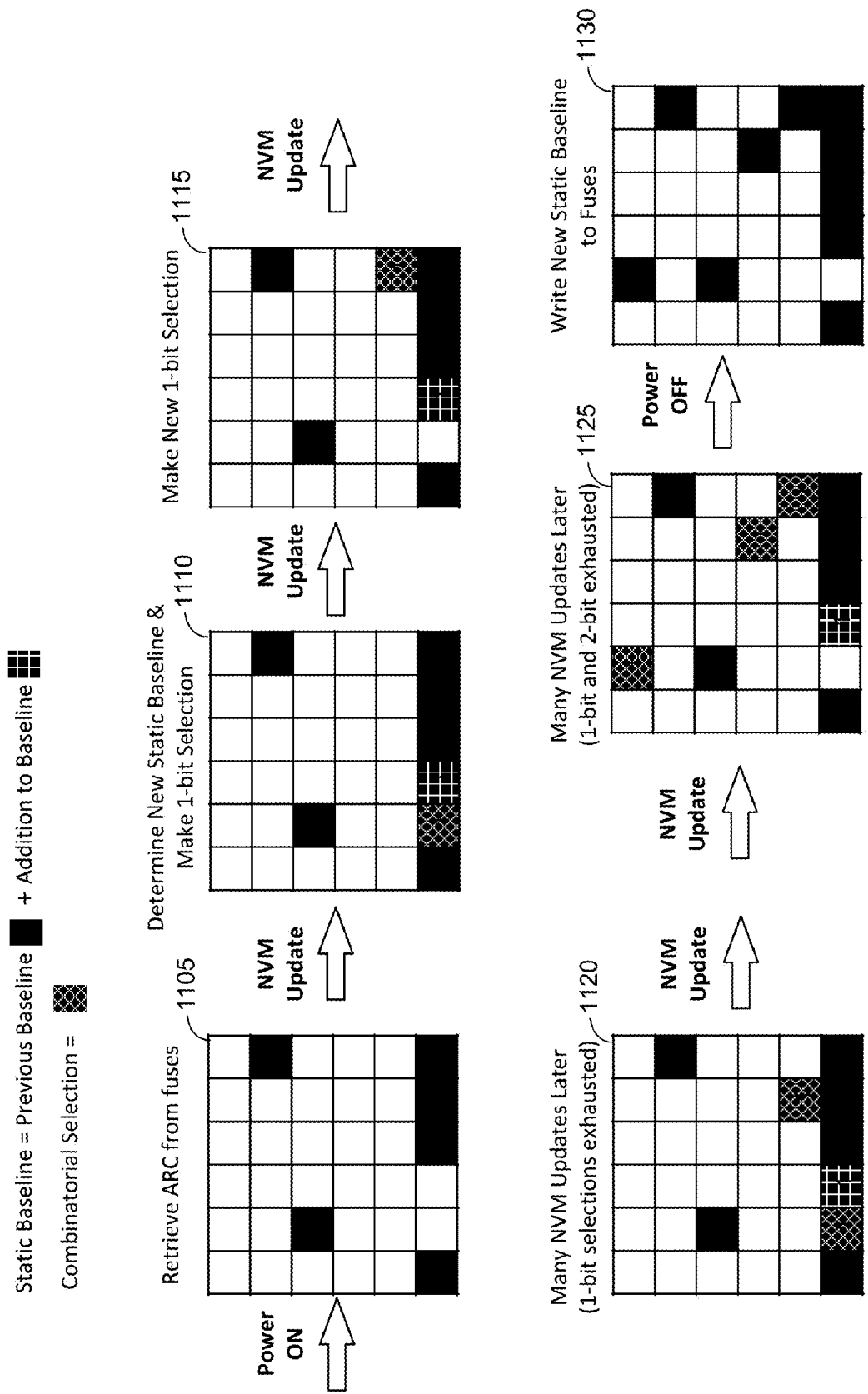
FIG. 11 is a diagram illustrating another technique for maintaining an anti-replay counter according to the techniques disclosed herein.

As illustrated in FIG. 1, when data is to be written to the external NVM 150, the processor 190 of the secure processing subsystem 110 can be configured to calculate a MAC 160 for the payload data 155 to be written to the external NVM 150. The MAC 160 can be generated using a keyed-hash message authentication code (HMAC). The HMAC algorithm is configured to receive data for which the MAC value is to be generated and a secret key used to generate the MAC value from data. FIG. 1 illustrates an example of the secure processing subsystem 110 including an HMAC block 130 that receives payload data and the ARC value stored in the volatile memory 120 of the secure processing subsystem 110. At least a portion of the ARC value can be selected by the HMAC block 130 for use in generating the MAC 160 for the data that will be written to the external NVM 150, which is referred to in FIG. 1 as the payload data 155. The value of the ARC value 140 stored in the volatile memory 120 can be incremented to a new value according prior to the MAC 160 being incremented to prevent a replay attack. The value of the ARC value 140 can be implemented using various techniques where at least a portion of the ARC value 140 may be selected using a random algorithm or a combinatorial algorithm. FIGS. 9-11 illustrate example processes in which the value of the ARC is incremented using various techniques.

The example computing device 100 illustrated in FIG. 1 can also be adapted to account for payload data 115 of varying sizes. For example, the payload size may comprise data that comprises the whole of the external NVM 150, data that corresponds to a memory page, or data of any size that has been flagged as being sensitive (data not flagged as sensitive may be stored in the external NVM 150 without requiring the MAC 160 or other such associated protections that may be provided for the payload data 155).

Figure 14:
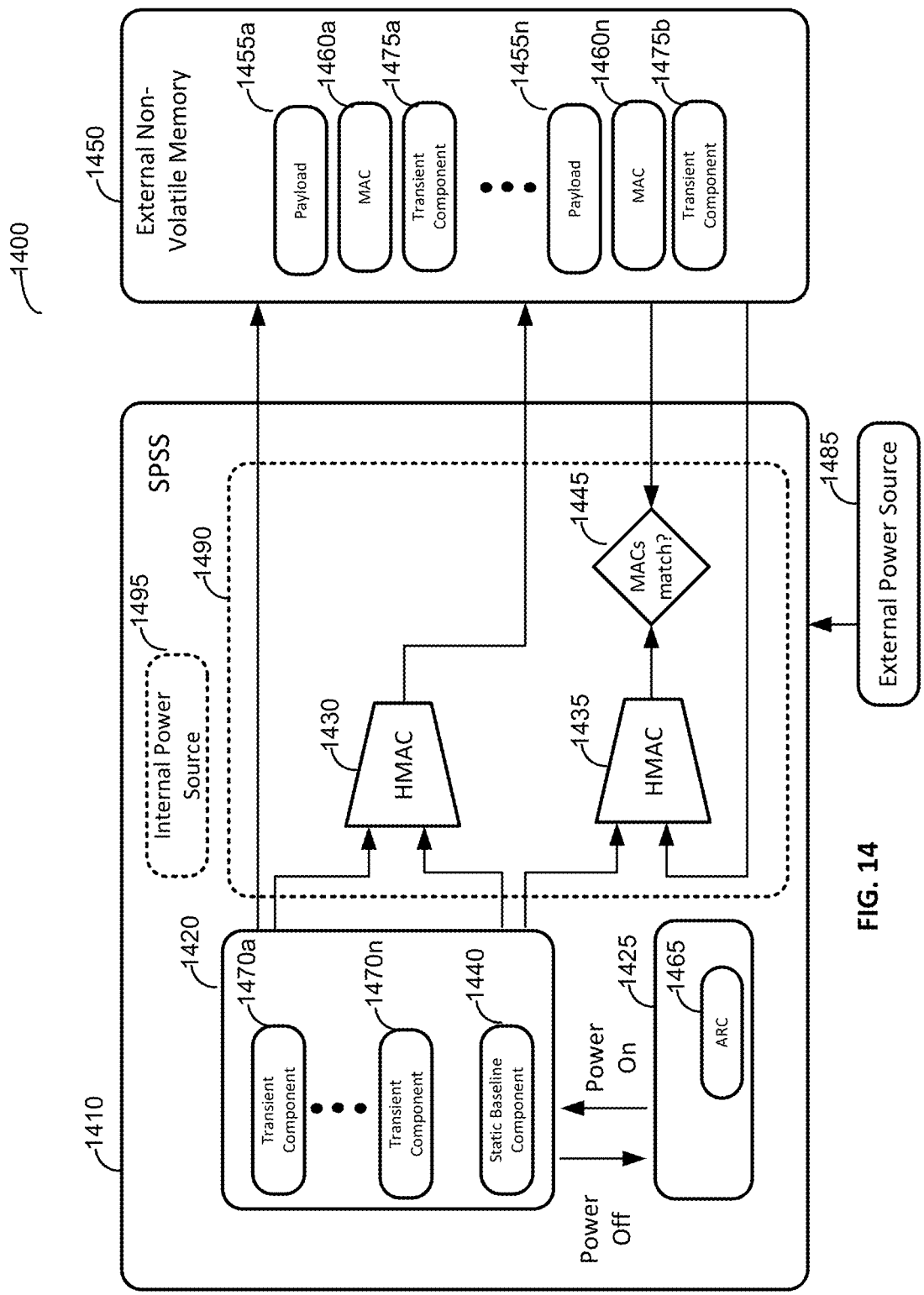
FIG. 14 is a functional block diagram of an example computer system illustrating the techniques disclosed herein.

FIG. 14 is a functional block diagram of an example computing device 1400 illustrating a variant of the technique disclosed herein. the example illustrated in FIG. 1 illustrates an example where there is a single instance of the payload data 155 and MAC 160 stored in the external NVM 150. The example computing device 1400 of FIG. 14 can be configured to store multiple payloads (e.g. payload 1455a-1455n) in the NVM 1450 with each payload having an associated MAC 160a-n, where a-n represents a range of integer values from 0 through an integer value n. The lower bound of n may be zero if no data is being stored in the NVM 1450 that is secured using the techniques disclosed herein, and the upper bound of the value of n may be limited by the amount of memory comprising the volatile memory 1420, the size of the NVM 1450, and/or other factors.

The computing device 1400 is similar to the computing device 100 illustrated in FIG. 14. The computing device 1400 includes a secure processing subsystem 1410 and an NVM 1450 which operate similar to the secure processing subsystem 110 and the external NVM 150 illustrated in FIG. 1. The computing device 1400 may also include an external power source 1485 and an internal power source 1495 which function similarly to the external power source 185 and an internal power source 195 of FIG. 1. The computing device 1400 includes a volatile memory 1420 similar to volatile memory 120 of computing device 100. The computing device 1400 can also include a processor 1490 which is similar to the processor 190, a HMAC block 1430 which is similar to HMAC block 130, a HMAC block 1435 which is similar to HMAC block 135, and/or a matching block 1445 which is similar to the matching block 145. The computing device 1400 can also include a one-time programmable memory 1425 similar to the one-time programmable memory 125.

The techniques employed by the computing device 1400 differ from that of the computing device 100 slightly to enable the computing device 1400 to support storing multiple payloads (e.g., payload 1450a-n) and multiple MACs (e.g., MAC 1460a-n) in the NVM 1450. One aspect that differs between the example implementation illustrated in FIG. 4 and the example implementation of FIG. 1 is how the ARC values are stored in the volatile memory 1420 of the secure processing subsystem 1410 versus that describe above with respect to FIG. 1. In the technique discussed in FIG. 1, a single ARC value comprising a static baseline component and a transient component can be stored in the volatile memory 120. In contrast, in the implementation illustrated in FIG. 4, multiple ARC values can be maintained since multiple payloads (e.g. payload 1455a-g) may be stored in the NVM 1450. Each payload 1455 can be associated with a different ARC value. The secure processing subsystem 1410 can be configured to keep track of the ARC for each payload 1455. The ARC values can each share the static baseline component 1440, which the transient component 1470 of the ARC value can be different for each payload 1455. The secure processing subsystem 1410 can store the multiple transient components (e.g., transient component 1470a-1470n) in the volatile memory 1420 along with the static baseline component 1440. Payload data may initially be stored in the volatile memory 1420 before being written to the NVM 1450. If the static baseline component 1440 has not yet been calculated, the processor 1490 of the secure processing subsystem 1410 can be configured to use the process illustrated in FIG. 8 to determine the static baseline component 1440 based on the ARC value 1465 stored in the one-time programmable memory 1425. The static baseline component 1440 can be maintained in the NVM 1450 until a triggering event occurs that causes the processor 1490 of the secure processing subsystem 1410 to update the ARC value 1465 in the one-time programmable memory 1425. These triggering events can be similar to those discussed above with respect to FIG. 1. In some implementations, the secure processing subsystem 1410 can write the static baseline component 1440 to the one-time programmable memory 1425 as the ARC value 1465. The secure processing subsystem 1410 can also be configured to combine a transient component 1470 with the static baseline component 1440 (e.g., as illustrated in FIGS. 9-11) to generate the ARC value to be written to the ARC value 1465 stored in the one-time programmable memory 1425. The secure processing subsystem 1410 can also be configured to select a most recently determined value of the transient component 1470 for generating the ARC value to be written to the ARC value 1465 stored in the one-time programmable memory 1425 or may select one of the transient component 1470 values in the volatile memory 120.

The processor 1490 of the secure processing subsystem 1410 can be configured to determine a transient component 1470 of the ARC for each payload 1455 that is written to the NVM 1450. The secure processing subsystem 1410 can be configured to determine the transient component 1470 of the ARC for a particular payload 1455 using one of the processes illustrated in FIGS. 9-13.

The secure processing subsystem 1410 can be configured to determine a MAC 1460 for the payload 1455 based on the ARC value for that payload comprising the static baseline component 1440 and the transient component 1470 (e.g., the ARC value for the payload 1455a comprises the static baseline component 1440 and the transient component 1470a). The processor 1490 of the secure processing subsystem 1410 can be configured to write the payload 1455 and the MAC 1460 to the NVM 1450. The secure processing subsystem 1410 can also be configured to optionally write the transient component 1470 to the NVM 1450 as transient component 1475 along with the payload 1455 and the MAC 1460. In some implementations, the secure processing subsystem 1410 can be configured to store the transient component 1475 for a payload in the external NVM 150 and not store a corresponding copy in the volatile memory 1420. The secure processing subsystem 1410 can also be configured to maintain a copy of the transient component 1470 in both the volatile memory 1420 and store the transient component 1475 in the NVM 1450. The secure processing subsystem 1410 can be configured to compare the value of the transient component 1470 and the value of the transient component 1475 as one step in the process of verifying whether the contents of the NVM 1450 may have been tampered with or have been corrupted. The MAC for the payload 1455 can be computed by combining the transient component 1470 or the transient component 1475 with the static baseline component 1440 and compared to the MAC 1460 that was stored in the NVM 1450. If the computed value of the MAC does not match the MAC 1460 associated with the particular payload 1455, then the contents of the NVM 1450 may have been tampered with or corrupted.

Figure 2:
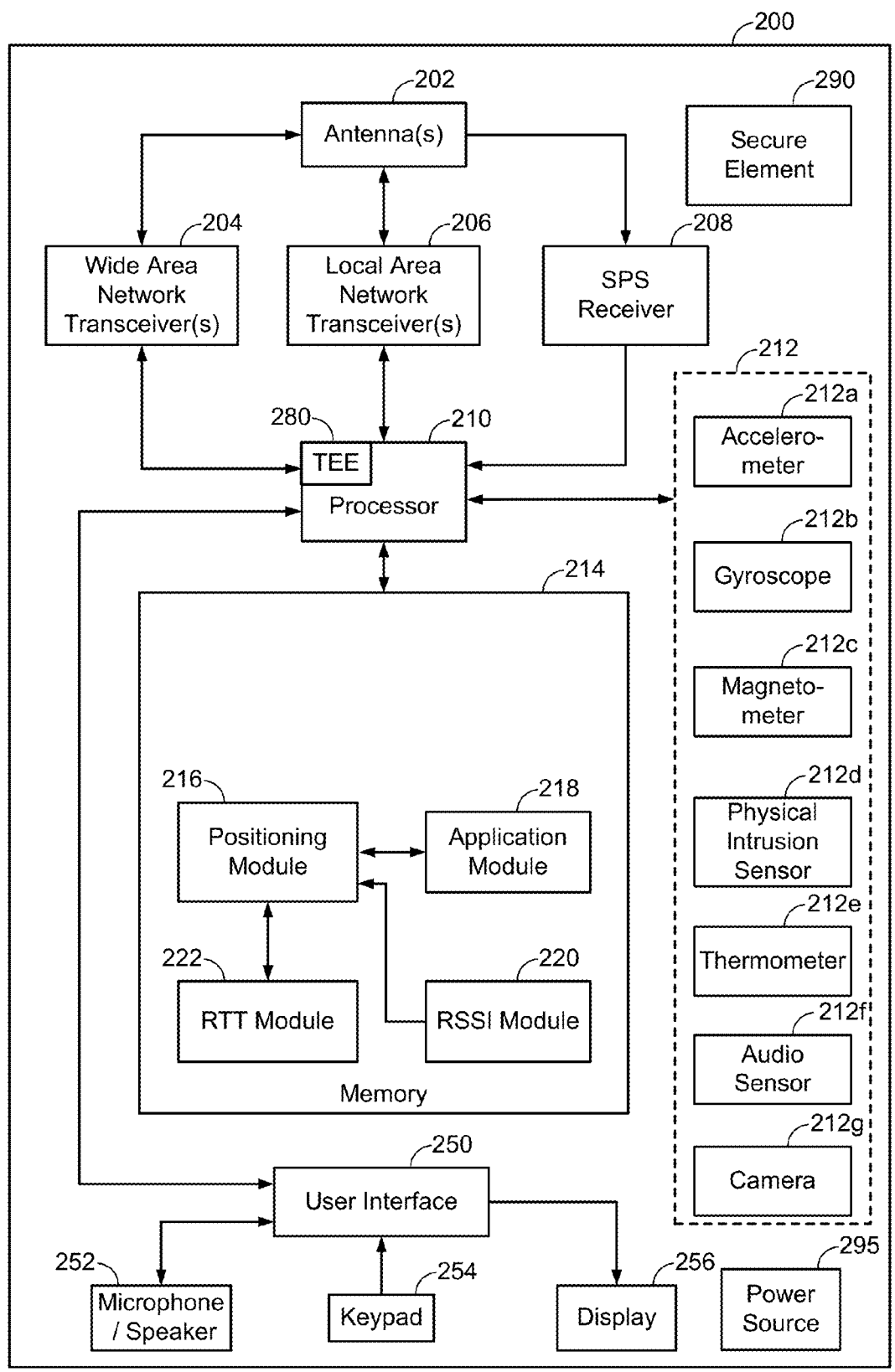
FIG. 2 is a functional block diagram of an example computer system that can be used to implement the computer system illustrated in FIG. 1.

FIG. 2 is a functional block diagram of an example computing device 200 that can be used to implement the computing device 100 illustrated in FIG. 1 or the computing device 1400 illustrated in FIG. 14. FIG. 2 is a schematic diagram illustrating various components of an example computing device 200, which may be similar to or the same as the computing device 100 depicted in FIG. 1 or the computing device 1400 depicted in FIG. 14 is shown. For the sake of simplicity, the various features/components/functions illustrated in the schematic boxes of FIG. 2 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 2 may be further subdivided, or two or more of the features or functions illustrated in FIG. 2 may be combined. Additionally, one or more of the features or functions illustrated in FIG. 2 may be excluded.

As shown, the computing device 200 may include one or more local area network transceivers 206 that may be connected to one or more antennas 202. The one or more local area network transceivers 206 comprise suitable devices, circuits, hardware, and/or software for communicating with and/or detecting signals to/from one or more of the WLAN access points 106a-e depicted in FIG. 1, and/or directly with other wireless devices within a network. In some embodiments, the local area network transceiver(s) 206 may comprise a WiFi (802.11x) communication transceiver suitable for communicating with one or more wireless access points; however, in some embodiments, the local area network transceiver(s) 206 may be configured to communicate with other types of local area networks, personal area networks (e.g., Bluetooth® wireless technology networks), etc. Additionally, any other type of wireless networking technologies may be used, for example, Ultra Wide Band, ZigBee, wireless USB, etc.

The computing device 200 may also include, in some implementations, one or more wide area network transceiver(s) 204 that may be connected to the one or more antennas 202. The wide area network transceiver 204 may comprise suitable devices, circuits, hardware, and/or software for communicating with and/or detecting signals from one or more of, for example, the WWAN access points and/or directly with other wireless devices within a network. In some implementations, the wide area network transceiver(s) 204 may comprise a CDMA communication system suitable for communicating with a CDMA network of wireless base stations. In some implementations, the wireless communication system may comprise other types of cellular telephony networks, such as, for example, TDMA, GSM, WCDMA, LTE etc. Additionally, any other type of wireless networking technologies may be used, including, for example, WiMax (802.16), etc.

In some embodiments, an SPS receiver (also referred to as a global navigation satellite system (GNSS) receiver) 208 may also be included with the computing device 200. The SPS receiver 208 may be connected to the one or more antennas 202 for receiving satellite signals. The SPS receiver 208 may comprise any suitable hardware and/or software for receiving and processing SPS signals. The SPS receiver 208 may request information as appropriate from the other systems, and may perform the computations necessary to determine the position of the computing device 200 using, in part, measurements obtained by any suitable SPS procedure.

As further illustrated in FIG. 2, the example computing device 200 includes one or more sensors 212 coupled to a controller/processor 210. For example, the sensors 212 may include motion sensors to provide relative movement and/or orientation information (which is independent of motion data derived from signals received by the wide area network transceiver(s) 204, the local area network transceiver(s) 206, and/or the SPS receiver 208). By way of example but not limitation, the motion sensors may include an accelerometer 212a, a gyroscope 212b, and a geomagnetic (magnetometer) sensor 212c (e.g., a compass), any of which may be implemented based on micro-electro-mechanical-system (MEMS), or based on some other technology. The one or more sensors 212 may further include a physical intrusion sensor 212d, a thermometer (e.g., a thermistor) 212e, an audio sensor 212f (e.g., a microphone) and/or other sensors. The output of the one or more sensors 212 may be provided as part of the data (along with antenna information for nodes communicating with the computing device 200 and/or with such data as location data) transmitted to a remote device or server (via the wide area network transceiver 204 and/or the local area network transceivers 206, or via some network port or interface of the computing device 200), for storage or further processing (e.g., antenna information for an AP communicating with the computing device 200 may be inferred by matching sensor data measured by the sensors of the mobile device with records that are maintained at the server and that include antenna information for various wireless nodes and associated sensor data that was previously obtained by one or more wireless devices). As further shown in FIG. 2, in some embodiments, the one or more sensors 212 may also include a camera 212g (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of UV and/or infra-red illumination.

The physical intrusion sensor 212d can be configured to generate a signal indicative of the occurrence of an event which may indicate that the external power source 185 of the computing device may be removed. The physical intrusion sensor 212d can comprise a mechanical switch that is triggered if a case of the computing device 200 is opened or a compartment in which the external power source 185 is disposed is opened, and is configured to generate a signal responsive to the case or compartment having been opened. The physical intrusion sensor 212d can also comprise a light sensor that can detect light entering the computing device 200 if a case of the computing device 200 is opened or a compartment in which the external power source 185 is disposed is opened, and can generate a signal indicative of the change in light level. The physical intrusion sensor 212d can also comprise a capacitive sensor that is configured to generate a signal responsive to a user of the computing device 200 touching the physical intrusion sensor 212d or being proximate to the sensor location, which may indicate that the user may remove the external power source 185 from the computing device 200. Other types of sensors can also be used to generate a signal responsive to an event that may indicate that the external power source 185 of the computing device 200 may be removed.

The processor(s) (also referred to as a controller) 210 may be connected to the local area network transceiver(s) 206, the wide area network transceiver(s) 204, the SPS receiver 208 and the one or more sensors 212. The processor may include one or more microprocessors, microcontrollers, and/or digital signal processors that provide processing functions, as well as other calculation and control functionality. The processor 210 may be coupled to storage media (e.g., memory) 214 for storing data and software instructions for executing programmed functionality within the mobile device. The memory 214 may be on-board the processor 210 (e.g., within the same IC package), and/or the memory may be external memory to the processor and functionally coupled over a data bus.

A number of software modules and data tables may reside in memory 214 and may be utilized by the processor 210 in order to manage both communications with remote devices/nodes, perform positioning determination functionality, and/or perform device control functionality. As illustrated in FIG. 2, in some embodiments, the memory 214 may include a positioning module 216 and an application module 218, a received signal strength indicator (RSSI) module 220, and/or a round trip time (RTT) module 222. It is to be noted that the functionality of the modules and/or data structures may be combined, separated, and/or be structured in different ways depending upon the implementation of the computing device 200. For example, the module 220 and/or the module 222 may each be realized, at least partially, as a hardware-based implementation, and may thus include such devices or circuits as a dedicated antenna (e.g., a dedicated RTT and/or an RSSI antenna), a dedicated processing unit to process and analyze signals received and/or transmitted via the antenna (s) (e.g., to determine signal strength of received signals, determine timing information in relation to an RTT cycle, etc.).

The application module 218 may be a process running on the processor 210 of the computing device 200, which may request position information from the positioning module 216 or other data from one of the other modules of the computing device 200. Applications typically run within an upper layer of the software architectures and may be implemented in a rich execution environment of the computing device 200, and may include indoor navigation applications, shopping applications, location aware service applications, etc. The positioning module 216 may derive the position of the computing device 200 using information derived from various receivers and modules of the computing device 200, e.g., based on measurements performed by the RSSI module and/or the RTT module. The positioning and application modules may also perform various processes (e.g., determine location estimates, perform navigation operations) based, in part, on ranging information associated with the transmitter(s) with which the mobile device is communicating (as discussed below in greater detail).

The processor 210 may include a trusted execution environment 280 and/or the computing device 200 may include a secure element 290. The trusted execution environment 280 and/or the secure element 290 can be used to implement the secure processing subsystem 110 illustrated in FIG. 1, and the external NVM 150 may be implemented by the memory 214 or another memory of the computing device 200 (not shown).

The processor 210 may also include a trusted execution environment 280. The trusted execution environment 280 can be implemented as a secure area of the processor 210 that can be used to process and store sensitive data in an environment that is segregated from the rich execution environment in which the operating system and/or applications (such as those of the application module 218) may be executed. The trusted execution environment 280 can be configured to execute trusted applications that provide end-to-end security for sensitive data by enforcing confidentiality, integrity, and protection of the sensitive data stored therein. The trusted execution environment 280 can be used to store encryption keys, anti-replay counter data, and/or other sensitive data. The processor 210 can also comprise one-time programmable memory that can be used to implement the one-time programmable memory 125 of FIG. 1.

The computing device 200 may include a secure element 290 (also referred to herein as a trusted component). The computing device 200 may include the secure element 290 in addition to or instead of the trusted execution environment 280. The secure element 290 can comprise autonomous and tamper-resistant hardware that can be used to execute secure applications and the confidential data associated with such applications. The secure element 290 can be used to store encryption keys, anti-replay counter data, and/or other sensitive data. The secure element 290 can also comprise one-time programmable memory that can be used to implement the one-time programmable memory 125 of FIG. 1. The secure element 290 can comprise a Near Field Communication (NFC) tag, a Subscriber Identity Module (SIM) card, or other type of hardware device that can be used to securely store data. The secure element 290 can be integrated with the hardware of the computing device 200 in a permanent or semi-permanent fashion or may, in some implementations, be a removable component of the computing device 200 that can be used to securely store data and/or provide a secure execution environment for applications.

The computing device 200 may further include a user interface 250 providing suitable interface systems, such as a microphone/speaker 252, a keypad 254, and a display 256 that allows user interaction with the computing device 200. The microphone/speaker 252 (which may be the same or different from the audio sensor 2120 provides for voice communication services (e.g., using the wide area network transceiver(s) 204 and/or the local area network transceiver(s) 206). The keypad 254 may comprise suitable buttons for user input. The display 256 may include a suitable display, such as, for example, a backlit LCD display, and may further include a touch screen display for additional user input modes.

FIG. 3 is a flow diagram of an example process for providing data protection in an integrated circuit according to the techniques disclosed herein. The process illustrated in FIG. 3 can be implemented by the processor of the secure processing subsystem 110 of the computing device 100 illustrated in FIGS. 1 and 2. The process illustrated in FIG. 3 can be used to generate and maintain an ARC counter according to the techniques discussed above with respect to FIG. 1. The process illustrated in FIG. 3 can also be modified to support the multiple payloads as discussed with respect to FIG. 14, in which each payload is associated with an ARC value An anti-replay counter value can be maintained in a volatile memory of the integrated circuit (stage 305). The integrated circuit can comprise a secure processing subsystem 110, such as that illustrated in FIG. 1 or another processing component of a computing device that can provide a secure execution environment and for secure data storage that can prevent unauthorized access to the data stored therein and/or prevent unauthorized execution of processor-executable program instructions by a processor of the secure processing subsystem 110 or other such processing component. The anti-replay counter value can be associated with data stored in an off-chip, non-volatile memory in which the integrated circuit is configured to store the data, such as the external NVM 150 illustrated in FIG. 1. The volatile memory of the integrated circuit comprises memory that maintains the data stored therein only so long as power is supplied to the memory. The secure processing subsystem 110 illustrated in FIG. 1 includes a volatile memory 120.

An external power source to the integrated circuit can be monitored (stage 310). The ARC can be stored in the volatile memory so long as power is supplied to the volatile memory of the integrated circuit. For example, the volatile memory 120 of the secure processing subsystem 110 can be used to maintain the ARC value so long as the power supply to the secure processing subsystem 110 remains available. The external power source may comprise a battery that powers the computing device 100. Loss of power from the external power source may result from the battery becoming fully or nearly fully discharged and unable to provide sufficient electrical output to power the computing device 100. The processor of the secure processing subsystem can also be configured to monitor the remaining battery power to determine whether the remaining battery power has fallen below a predetermined threshold which can indicate that the power from the external power supply may soon be lost.

Write the anti-replay counter value to a programmable read-only memory of the integrated circuit responsive to a loss of power to the integrated circuit from the external power source (stage 315). The term "loss of power" as used herein can be understood to indicate that the external power supply is no longer providing electrical power to the secure processing subsystem 110 or that the remaining power level of the external power supply has reached a threshold where loss of power to the secure processing subsystem is imminent. The processor can take the current value of the ARC stored in the volatile memory 120 and write the current value of the ARC to the one-time programmable memory 125 of the secure processing subsystem 110. The bits comprising the value of the ARC can be stored in the one-time programmable memory 125 by blowing the appropriate set of fuses in the one-time programmable memory 125 corresponding ARC value.

The secure processing subsystem 110 can include a secondary internal power supply, such as a capacitor. The secondary internal power supply can be configured to store a small amount of electrical energy that can be used to write the ARC value from the volatile memory 120 to the one-time programmable memory 125 responsive to the loss of power from the external power supply. Where the secure processing subsystem 110 does not include such a secondary power supply, the secure processing subsystem 110 can be configured to monitor to the remaining power level of the external power source and can be configured to write the ARC value from the volatile memory 120 to the one-time programmable memory 125 responsive to the remaining power level of the external power source falling below a predetermined threshold.

The secure processing subsystem 110 can also include a physical intrusion sensor or be configured to receive a signal from a physical intrusion sensor of the computing device 100, such as the physical intrusion sensor 212d illustrated in the example implementation of the computing device illustrated in FIG. 2. The physical intrusion sensor can be configured to output a signal responsive to detecting physical tampering with the computing device 100, which may indicate that a user of the computing device 100 is attempting to remove the battery or other external power source of the computing device 100. The processor of the secure processing subsystem 110 can be configured to monitor for signals from the physical intrusion sensor and to write the ARC value from the volatile memory 120 to the one-time programmable memory 125 responsive to a signal from the physical intrusion sensor. The physical intrusion sensor may be included where the secure processing subsystem 110 does not include a secondary internal power source to provide power in the event that the external power source is removed from the computing device 100.

FIG. 4 is a flow diagram of an example process for maintaining an anti-replay counter according to the techniques disclosed herein that can be used to implement at least in part the process illustrated in FIG. 3. For example, the process illustrated in FIG. 4 can be used to implement, at least in part, stage 310 of the process illustrated in FIG. 3. The process illustrated in FIG. 4 can be implemented by the processor of the secure processing subsystem 110 of the computing device 100 illustrated in FIGS. 1 and 2. The process illustrated in FIG. 4 can be used to maintain an ARC counter according to the techniques discussed above with respect to FIG. 1.

A sensor associated with computing device in which integrated circuit is disposed can be monitored (stage 405). The secure processing subsystem 110 can also include a sensor or be configured to receive a signal from a sensor of the computing device 100, such as the physical intrusion sensor 212d illustrated in the example implementation of the computing device illustrated in FIG. 2. The sensor can be configured to output a signal after detecting activity that may be indicative of physical tampering with the computing device 100. Such tampering may indicate that a user of the computing device 100 is attempting to remove the battery or other external power source of the computing device 100, and which can trigger the secure processing subsystem 110 to store the ARC value 140.

FIG. 5 is a flow diagram of an example process for maintaining an anti-replay counter according to the techniques disclosed herein that can be used to implement at least in part the process illustrated in FIG. 3. For example, the process illustrated in FIG. 4 can be used to implement, at least in part, stage 315 of the process illustrated in FIG. 3. The process illustrated in FIG. 4 can be implemented by the processor of the secure processing subsystem 110 of the computing device 100 illustrated in FIGS. 1 and 2. The process illustrated in FIG. 4 can be used to maintain an ARC counter according to the techniques discussed above with respect to FIG. 1.

The anti-replay counter can be written to the programmable read-only memory of the integrated circuit responsive to the loss of power to the integrated circuit (stage 505). The processor of the secure processing subsystem 110 can be configured to monitor for signals from the physical intrusion sensor and to write the ARC value from the volatile memory 120 to the one-time programmable memory 125 responsive to a signal from the physical intrusion sensor. The physical intrusion sensor may be included where the secure processing subsystem 110 does not include a secondary internal power source to provide power in the event that the external power source is removed from the computing device 100.

FIG. 6 is a flow diagram of an example process for determining an anti-replay counter according to the techniques disclosed herein that can be used to implement at least in part the process illustrated in FIG. 3. For example, the process illustrated in FIG. 6 can be used to implement, at least in part, stage 305 of the process illustrated in FIG. 3. The process illustrated in FIG. 6 can also be a standalone process that can be used to determine an ARC value and can be used to provide data protection in an integrated circuit. The process illustrated in FIG. 6 can be implemented by the processor of the secure processing subsystem 110 of the computing device 100 illustrated in FIGS. 1 and 2. The process illustrated in FIG. 6 can be used to generate and maintain an ARC counter according to the techniques discussed above with respect to FIG. 1.

A static baseline value can be determined based on an anti-replay counter value stored in the one-time programmable memory 125 (stage 605). The ARC can comprise a static baseline component and a write-specific component. The static baseline component is a value that is stored in the one-time programmable memory 125 of the secure processing subsystem 110. The static baseline component The static baseline component of the ARC can be modified each time that the computing device 100 is powered up or rebooted in order to prevent a replay attack. The static baseline component of the ARC may remain the same for a period of time, while the write-specific component of the ARC can be redetermined each time that data is to be written to the external NVM 150. The static baseline component of the ARC can remain unchanged for multiple writes to the NVM and can be updated with a current ARC value at the time a triggering event occurs which causes the processor of the secure processing subsystem 110 to write the ARC value from the volatile memory 120 to the one-time programmable memory 125. FIGS. 9-11, which are discussed in detail below, illustrate examples of processes for generating an maintaining an ARC value and provide examples of how the static baseline value for an ARC can be determined.

An anti-replay counter value can be determined based on the static baseline value and a transient component (stage 610). The transient component (also referred to herein as a write-specific component of the ARC) can be redetermined each time that data is to be written to external NVM 150 by the integrated circuit or may be redetermined based on some other event in which the ARC value is required. The transient component of the ARC can be determined using various techniques. The ARC can be generated by selecting one or more bits that have not yet been set in the portion of external NVM 150 in which the ARC value that serves as the static baseline component of the ARC is stored. The bits can be selected by the processor of the secure processing subsystem 110 using a random selection technique, a partially random selection technique, or a combinatorial selection technique. FIG. 9-11 provide some examples of techniques that can be used to generate the transient component of the ARC. Other random or combinatorial techniques can also be used to determine the transient component of the ARC.

The anti-replay counter value can be stored in the volatile memory 120 (stage 620). The processor of the secure processing subsystem 110 can be configured to store the ARC value that was determined in the previous stage in the volatile memory 120. FIGS. 9-11 illustrates some example fuse maps that may be used to represent the ARC value in the volatile memory 120. The processor can be configured to access the volatile memory 120 each time that data is to be written to the external NVM 150 and to increment the ARC value stored in the volatile memory 120. At least a portion of the updated ARC value can be used to determine the MAC 160 that can be used to determine that the payload data 155 (the data written to the external NVM 150) has not been modified since the data was written to the external NVM 150. Furthermore, this approach also prevents replay attacks since the ARC value is used to generate the MAC. If an attacker were to introduce a copy of an old MAC and payload data 155 into the external NVM 150, the secure processing subsystem 110 would recognize that the data is out of date because the MAC 160 has been calculated with an old ARC value. The secure processing subsystem 110 can calculate the MAC of the payload data 155 using the current ARC and compare that MAC value to the MAC 160. If the two MACs do not match, the data in the external NVM 150 has been corrupted or modified.

FIG. 7 is a flow diagram of an example process for storing data in a non-volatile memory according to the techniques disclosed herein that can be used to implement at least in part the process illustrated in FIG. 3. For example, the process illustrated in FIG. 7 can be used to implement, at least in part, stage 310 of the process illustrated in FIG. 3. The process of FIG. 7 can also follow the process illustrated in FIG. 6, where the process illustrated in FIG. 6 is a standalone process that is not part of the process illustrated in FIG. 3. The process illustrated in FIG. 7 can be implemented by the processor of the secure processing subsystem 110 of the computing device 100 illustrated in FIGS. 1 and 2. The process illustrated in FIG. 7 can use the ARC generated according to the processes discussed above to generate a MAC for data to be stored in the external NVM 150.

A message authentication code (MAC) or a cryptographic signature on at least the data or a digest of the data to be written to the off-chip, non-volatile memory using at least part of the ARC value can be computed (stage 705). As illustrated in FIG. 1, when data is to be written to the external NVM 150, the processor of the secure processing subsystem 110 can be configured to calculate a MAC 160 for the payload data 155 to be written to the external NVM 150. The MAC 160 can be generated using a keyed-hash message authentication code (HMAC). The HMAC algorithm is configured to receive data for which the MAC value is to be generated and a secret key used to generate the MAC value from data. FIG. 1 illustrates an example of the secure processing subsystem 110 including an HMAC block 130 that receives payload data and the ARC value stored in the volatile memory 120 of the secure processing subsystem 110. At least a portion of the ARC value can be selected by the HMAC block 130 for use in generating the MAC 160 for the data that will be written to the external NVM 150, which is referred to in FIG. 1 as the payload data 155. The value of the ARC value 140 stored in the volatile memory 120 can be incremented to a new value according prior to the MAC 160 being incremented to prevent a replay attack. The value of the ARC value 140 can be implemented using various techniques where at least a portion of the ARC value 140 may be selected using a random algorithm, a partially random algorithm, or a combinatorial algorithm. FIGS. 9-11 illustrate example processes in which the value of the ARC is incremented using various techniques.

The processor of the secure processing subsystem 110 can be configured to generate a cryptographic signature on at least a part of the data or a digest of the data to be written to the external NVM 150. For example, the processor of the secure processing subsystem 110 can be configured to generate a hash of at least part of the data or a digest of the data and to encrypt the hash or digest of the data. The encrypted hash may be stored in the external NVM 150 with the data instead of or in addition to the MAC 160.

The data and the MAC or the cryptographic signature can be written to external NVM 150 (stage 710). The MAC 160 generated by the HMAC block 130 and the payload data 155, the data for which the MAC 160 was generated, can be written to the external NVM 150 by the processor of the secure processing subsystem 110. An encrypted signature for the payload data 155 may be generated and stored in the external NVM 150 instead of or in addition to the MAC 160. The copy of the payload data 115 stored in the volatile memory 120 can be deleted to free space the non-volatile memory for other data.

Figure 8:
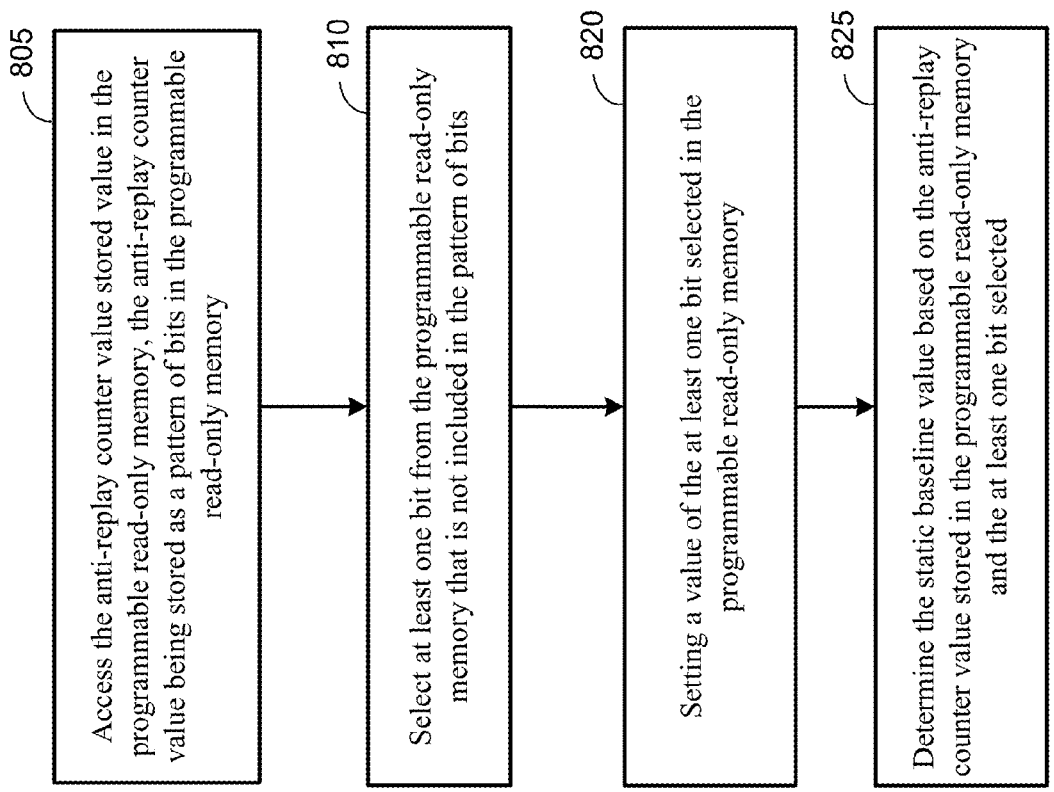
FIG. 8 is a flow diagram of an example process for determining a static baseline value of an anti-replay counter according to the techniques disclosed herein that can be used to implement at least in part the process illustrated in FIG. 6.

FIG. 8 is a flow diagram of an example process for determining a static baseline value of an anti-replay counter according to the techniques disclosed herein that can be used to implement at least in part the process illustrated in FIG. 6. For example, the process illustrated in FIG. 8 can be used to implement, at least in part, stage 605 of the process illustrated in FIG. 6. The process illustrated in FIG. 8 can be implemented by the processor of the secure processing subsystem 110 of the computing device 100 illustrated in FIGS. 1 and 2. The process illustrated in FIG. 8 can be used to generate the static baseline value of an ARC. The example processes illustrated in FIG. 9-11 can use the process of FIG. 8 to generate the static baseline value used therein.

An anti-replay counter value stored in the programmable read-only memory can be accessed (stage 805). As discussed above, the ARC value 165 can be stored as a pattern of bits in the one-time programmable memory 125. The static baseline value can be written to the one-time programmable memory 125 by the processor of the secure processing subsystem 110 in response to a trigger event, such as a signal from a physical intrusion sensor, the remaining power from an external power source falling below a predetermined threshold, no power being provided by the external power source, or a combination thereof. The anti-replay counter value stored in the one-time programmable memory 125 may be accessed when the computing device 100 is powered up or rebooted and can be used to establish a current ARC value. The anti-replay counter value read from the one-time programmable memory 125 and copied to the volatile memory 120 of the secure processing subsystem 110. The ARC value 140 can be stored in the volatile memory 120 as an array of bit values (as referred to herein as "fuse maps") that represent whether a particular fuse associated with that bit has been blown in the one-time programmable memory 125. The fuse maps may be represented using one-dimensional or multi-dimensional arrays. Some examples of this are illustrated in FIGS. 9-11 where the anti-replay counter is represented by a fuse map which indicates which bits in the one-time programmable memory 125 were set as the baseline value.

At least one bit from the programmable read-only memory that is included in the pattern of bits and has not been set can be selected (stage 810). The processor of the secure processing subsystem 110 can be configured to select at least one bit that has not been set in the one-time programmable memory 125. The at least one bit can be selected randomly or can be selected using a combinatorial algorithm. The example processes illustrated in FIGS. 9-11 discuss example techniques for how the at least one bit may be selected. The value of the one or more selected bits can be set in the fuse map representing the ARC value 140 stored in the volatile memory 120.

The value of the at least one bit selected can be set in the programmable read-only memory (stage 815). The processor of the secure processing subsystem 110 can be configured to set the at least one bit corresponding the at least one bit selected in stage 815 by blowing the appropriate fuses in the one-time programmable memory 125. Blowing the fuses increments the ARC value 165 stored in the one-time programmable memory 125. The ARC value 165 stored in the one-time programmable memory 125 is incremented prior to the ARC value being utilized to determine a MAC value for data being stored in the external NVM 150. This approach can thwart a replay attack from being staged where the battery or other external power supply is removed from the computing device 100 in an attempt to reset the counter value used by the secure processing subsystem. The updated value for the ARC value 165 will serve as the static baseline value the next time that the computing device 100 is powered up or rebooted and the static baseline value will once again be incremented before any writes to the external NVM 150 can occur. If an attacker were to attempt to insert an old MAC and old payload data into external NVM 150, the secure processing subsystem 110 would access the payload data 155 from the external NVM 150, and the secure processing subsystem 110 would recognize that the MAC 160 stored the external NVM 150 does not match the recalculated MAC value due to the ARC value having been incremented.

The static baseline component of the ARC can be determined based on the anti-replay counter value stored in the programmable read-only memory and the at least one bit selected (stage 825). The value of the one or more selected bits from stage 810 can be set in the fuse map representing the ARC value 140 stored in the volatile memory 120 to produce the static baseline component of the ARC value 140 stored in the volatile memory 120. A write-specific component of the ARC can also be determined each time that data is to be written to the external NVM 150. The write-specific component of the ARC can comprise one or more bits from the fuse map comprising the ARC value 140 that have not yet been set. The bits for the write-specific component of the ARC value 140 can be selected using a random, partially random, or combinatorial approach. Some examples illustrating how the write-specific component can be found in the examples illustrated in FIGS. 9-11.

FIG. 9 is a diagram illustrating a nonce-based technique for maintaining an anti-replay counter (ARC) according to the techniques disclosed herein. The technique illustrated in FIG. 9 can be implemented by the computing device 100 illustrated in FIGS. 1 and 2. The technique illustrated in FIG. 9 is illustrated using a series of fuse maps: fuse map 905, fuse map 910, fuse map 915, fuse map 920, fuse map 925, and fuse map 930 that represent an array of fuses in the one-time programmable memory 125 of the secure processing subsystem 110. Each square in a fuse map represents one fuse which can be blown to set a corresponding bit value. Bit values that have already been set are represented by the number "1" in that square. The shading of the square represents how that particular bit was set. In the example illustrated in FIG. 9, a square having a solidly shaded background indicates that the bit was set as part of the static baseline value associated with the (ARC), a square having a background shaded with a checkerboard pattern indicates that the bit was set in addition to the static baseline that has been selected to prevent a rollback attack, and a square having a background shaded with a diamond pattern indicates that the bit was set as part of a random selection.

The technique illustrated in FIG. 9 can reduce the number of fuses that are required to maintain the ARC in the one-time programmable memory 125. As discussed above, the ARC can be maintained in the volatile memory 120 of the secure processing subsystem 110 while the computing device 100 is receiving power from a battery or other such power source. The ARC value stored in the volatile memory 120 can be incremented each time that data is written to external NVM 150. When the power source has been depleted and/or when the physical intrusion sensor 212d detects physical intrusion into the computing device 100 which may indicate that the battery or other power source may be removed from the computing device 100, the ARC value maintained in the volatile memory 120 can be written to the one-time programmable memory 125 of the secure processing subsystem 110. The storage capacity of the one-time programmable memory 125 of the secure processing subsystem 110 is typically limited. The number of fuses included in the one-time programmable memory 125 of the secure processing subsystem 110 can be limited due to cost and size limitations of the integrated circuit on which the secure processing subsystem 110 is implemented.

The process illustrated in FIG. 9 can begin when the computing device 100 is powered up. At the time that the computing device 100 was powered down, a baseline value for the ARC may have been written to the fuses of the one-time programmable memory 125. A processor of the secure processing subsystem 110 can be configured to access the one-time programmable memory 125 and to read the ARC value stored therein at the time that the computing device 100 is powered up. The fuse map 905 represents a 6×6 array of fuses comprising an ARC baseline value that has been previously written to the one-time programmable memory 125. The size and configuration of the fuse map illustrated in FIG. 9 are intended to illustrate the processes that are being disclosed herein and are not intended to limit these processes to a fuse map of a specific size or configuration. The number of fuses included in the one-time programmable memory 125 of the secure processing subsystem 110 can be more than the example illustrated in FIG. 9. The techniques illustrated in FIGS. 9-11 provide ways of storing an ARC value in the limited number of fuses available in the one-time programmable memory 125 so that the limited supply of fuses is not exhausted in a small number of power cycles or physical intrusion events which trigger the ARC to be written to the one-time programmable memory 125.

The example fuse map 905 has 4 bits which were previously set as a static baseline value. The static baseline value may have been determined using one of the techniques illustrated in FIGS. 9-11 or may have been a selected seed value that was initially used as an ARC value. The portion of the one-time programmable memory 125 used to store the ARC may have initially been blank, with no fuses blown, initially and the static baseline value stored illustrated in fuse map 905 may have represented a previous value of the ARC that was written to the one-time programmable memory 125 from the volatile memory 120. The processor of the secure processing subsystem 110 can access the one-time programmable memory 125, read the fuse map values from the one-time programmable memory 125, and store a representation of the fuse map in the volatile memory 120 of the secure processing subsystem 110.

After loading the previous baseline value from the one-time programmable memory 125, the processor of the secure processing subsystem 110 can be configured to select at least one bit to add to the previous baseline as illustrated in fuse map 910. The processor can be configured to randomly select the at least one bit from bits of the fuse map that have not yet been set. The processor can be configured to blow the fuses associated with the one or more bits that have been selected in the one-time programmable memory 125 to establish a new static baseline value. The new baseline value prevents a replay attack where an attacker attempts to place old data into the external NVM 150 and have the secure processing subsystem 110 process the old data. Referring to the example illustrated in FIG. 1, the data stored in the external NVM 150 includes a payload data 155 and a MAC 160. The MAC 160 can be recalculated for the payload data 155 using the current ARC value stored in the volatile memory 120. The value of the recalculated MAC and the MAC 160 will no longer match if old data is placed into the external NVM 150, because the ARC maintained in the volatile memory 120 is incremented each time data is written to the external NVM 150.

Fuse map 910 also illustrates another aspect of the process. At least one additional bit is selected as a random selection component of the ARC. The at least one bit is selected from fuses that have not been set in the fuse map stored in the volatile memory 120. In the example illustrated in FIG. 9, the random component includes three bits, but the random component may include a greater or fewer number of bits. The random selection is selected again each time data is written to the external NVM 150. The random selection portion of the ARC is not written to the fuses of the one-time programmable memory 125. The random selection portion is maintained only in the representation of the fuse map stored in the volatile memory 120.

Fuse map 915 illustrates an example of the fuse map 905 in the volatile memory 120 having been updated in response to data being written to the external NVM 150. The updated static baseline value includes the at least one bit that was added to the static baseline retrieved from the one-time programmable memory 125. But, the randomly selected portion of the ARC is replaced by a new random selection of one or more bits. In the example illustrated in fuse map 915, three bits were randomly selected from the bits of the fuse map that were not part of the updated static baseline. A greater or fewer number of bits can be selected from the available bits that are not part of the updated static baseline each time that the random component of the ARC is redetermined when data is written to the external NVM 150.

The fuse map 920 illustrates an example of the fuse map 915 in the volatile memory 120 having been updated in response to data being written to the external NVM 150. Once again, a new random selection of bits from the fuse map are selected from the bits that are not part of the updated static baseline. In the example illustrated in fuse map 920, four bits were selected from the available bits, but a greater or fewer number of bits can be selected from the available bits that are not part of the updated static baseline each time that the random component of the ARC is redetermined when data is written to the external NVM 150.

The processor then determines the power source has been depleted and/or determines that the physical intrusion sensor 212d has detected physical intrusion into the computing device 100. The processor then accesses the current fuse map in the volatile memory 120 and writes those values to the fuses of the one-time programmable memory 125 as the new static baseline value. In the example of FIG. 9, the fuse map in the volatile memory 120 was in the state illustrated by fuse map 920. The fuses set in this map will become the new static baseline value that is written to the one-time programmable memory 125 by the processor as represented by fuse map 925.

Fuse map 930 illustrates an example fuse map in the volatile memory 120 in which the static baseline illustrated in fuse map 925 has been updated to include an additional bit. The processor of the secure processing subsystem 110 can write the additional bit to the fuses of the one-time programmable memory 125. The processor can also select a set of one or more randomly selected bits that includes bits from the fuse map in the non-volatile memory that are not part of the updated static baseline. This process of selecting a new random component to the ARC can occur each time that data is written to the external NVM 150, and can continue until an event triggers the processor to write the current fuse map from the volatile memory 120 into the fuses comprising the one-time programmable memory 125.

FIG. 10 is a diagram illustrating another technique for maintaining an anti-replay counter according to the techniques disclosed herein. The technique is similar to that illustrated in FIG. 9, but uses a partially randomized approach in which the portion of the ARC that is added to the static baseline component can be randomly selected while the transient component of the ARC is determined using a combinatorial approach. The technique illustrated in FIG. 10 is illustrated using a series of fuse maps: fuse map 1005, fuse map 1010, fuse map 1015, fuse map 1020, and fuse map 1025 that represent an array of fuses in the one-time programmable memory 125 of the secure processing subsystem 110. In the example illustrated in FIG. 10, a square having a solidly shaded background indicates that the bit was set as part of the static baseline value associated with the (ARC), a square having a background shaded with a checkerboard pattern indicates that the bit was set an addition to the static baseline that has been selected to prevent a rollback attack, and a square having a background shaded with a diamond pattern indicates that the bit was set as part of a combinatorial selection component of the transient component of the ARC.

The process illustrated in FIG. 10 can begin when the computing device 100 is powered up like that of the process of FIG. 9 discussed above. At the time that the computing device 100 was powered down, a baseline value for the ARC may have been written to the fuses of the one-time programmable memory 125. The processor of the secure processing subsystem 110 can access the one-time programmable memory 125, read the fuse map values from the one-time programmable memory 125, and store a representation of the fuse map in the volatile memory 120 of the secure processing subsystem 110 to generate the fuse map 1005. The fuse map 1005 is identical to that of fuse map 905 discusses above, but the process could start with a different static baseline or no static baseline value at all as discussed above with respect to FIG. 9.

A new static baseline value can also be determined as discussed above with respect to FIG. 9. The processor of the secure processing subsystem 110 can select at least one bit to add to the previous baseline as illustrated in fuse map 1010. The processor can be configured to randomly select the at least one bit from bits of the fuse map that have not yet been set. The processor can be configured to blow the fuses associated with the one or more bits that have been selected in the one-time programmable memory 125 to establish a new static baseline value. The static baseline value stored in the one-time programmable memory 125 may initially start with no bits set.

Fuse map 1010 also illustrates another aspect of the process. At least one additional bit is selected as a combinatorial selection component of the ARC. The combinatorial selection component of the ARC illustrated in FIG. 10 differs from the random selection component of the ARC illustrated in FIG. 9. The combinatorial selection component is not a randomly selected set of bits. Instead, the a starting point is selected in the bit map. The starting point may be any bit from the fuse map that has not yet been selected. For example, the bit in the bottom right hand corner of the fuse map has been a selected in the example fuse map 1010, but any bit that has not yet been set may be selected.

The technique illustrated in FIG. 10 minimizes the number of bits that are selected for the combinatorial selection component of the ARC each time that the ARC value is incremented before writing data to the external NVM 150. For example, the process illustrated in FIG. 10 can iterate through each of the possible combinations where the combinatorial selection component comprises 1-bit. Once the 1-bit options have been exhausted, the process can iterate through each of the 2-bit options until the 2-bit options have been exhausted. This process can continue, adding another bit as each of the series n-bit options are exhausted, until all possible combinations are exhausted or until the ARC value is written to the one-time programmable memory 125. The monotonic selection portion of the ARC is not written to the fuses of the one-time programmable memory 125 until an event triggers the processor to write the current fuse map from the volatile memory 120 into the fuses comprising the one-time programmable memory 125. The monotonic selection portion is maintained only in the representation of the fuse map stored in the volatile memory 120 until such a write event occurs.

Fuse map 1015 illustrates an example illustrated how the fuse map 1010 could change after data has been written to the external NVM 150 eight times. The combinatorial selection component of the ARC has increment by eight bits. All of the 1-bit options have not yet been exhausted. In the example of FIG. 10, the ARC increments from left to right and from bottom to top, but other algorithms could be used to determine the order in which the various permutations of the combinatorial selection component are visited.

Fuse map 1020 illustrates an example illustrated how the fuse map 1015 could change after data has been written to the external NVM 150 thirty-two times. The combinatorial selection component of the ARC has increment by thirty-two bits. All of the 1-bit options have been exhausted, and the process continues with a 2-bit combinatorial selection component of the ARC. In the example of FIG. 10, the ARC increments from left to right and from bottom to top, but other algorithms could be used to determine the order in which the various permutations of the combinatorial selection component are visited.

The processor then determines the power source has been depleted and/or determines that the physical intrusion sensor 212$d$ has detected physical intrusion into the computing device 100. The processor then accesses the current fuse map in the volatile memory 120 and writes those values to the fuses of the one-time programmable memory 125 as the new static baseline value. In the example of FIG. 10, the fuse map in the volatile memory 120 was in the state illustrated by fuse map 1020. The fuses set in this map will become the new static baseline value that is written to the one-time programmable memory 125 by the processor as represented by fuse map 1025.

FIG. 11 is a diagram illustrating another technique for maintaining an anti-replay counter according to the techniques disclosed herein. The technique is similar to that illustrated in FIGS. 9 and 10, but uses a deterministic combinatorial approach to determine the portion of the ARC that is added to the static baseline component as well as the transient component of the ARC. The technique illustrated in FIG. 11 is illustrated using a series of fuse maps: fuse map 1105, fuse map 1110, fuse map 1115, fuse map 1120, fuse map 1125, and fuse map 1130, that represent an array of fuses in the one-time programmable memory 125 of the secure processing subsystem 110. In the example illustrated in FIG. 11, a square having a solidly shaded background indicates that the bit was set as part of the static baseline value associated with the (ARC), a square having a background shaded with a checkerboard pattern indicates that the bit was set an addition to the static baseline that has been selected to prevent a rollback attack, and a square having a background shaded with a diamond pattern indicates that the bit was set as part of a combinatorial component of the ARC.

The technique illustrated in FIG. 11 uses a combinatorial approach to determine a combinatorial component of the ARC that is added to the static baseline component of the ARC. The number of bits that are included in the combinatorial component can vary depending on how often the device may be powered off. The techniques illustrated in FIG. 11 may reduce the number of fuses of the one-time programmable memory 125 are written to for each power-down cycle when compared to the techniques illustrated in FIGS. 9 and 10. The technique is similar to that of FIG. 10, but each of the updates to the fuse map in technique illustrated in FIG. 11 are deterministic and no random selection of bits are made in the technique of FIG. 11.

The combinatorial component of the ARC is a deterministic selection of X bits among the available bits of the one-time programmable memory 125 that have not be set as part of the static baseline. The combinatorial component of the ARC is determined for each write of data to the external NVM 150. The available bits that can be included in the combinatorial component and the total number of available bits can be determined using the following equations:

Available Bits=Max Bits−Bits in Static Baseline, where the max number of bits represents the total number of bits comprising the portion of the one-time programmable memory 125 represented by the fuse map, and where the bits in the static baseline represents the fuses that have been blown in the updated static baseline value in which at least one additional bit has been blown (as illustrated in fuse map 1110). Thus, the available bits are those bits that have not yet been set and could be included in the combinatorial component of the ARC.

Number of Available Bits=Max Number of Bits−
Number of Bits in Static Baseline, where the max number of bits represents the total number of bits comprising the portion of the one-time programmable memory 125 represented by the fuse map, and where the number of bits in the static baseline represents the number of fuses that have been blown in the updated static baseline value in which at least one additional bit has been blown (as illustrated in fuse map 1110). Thus, the number available bits are those bits that have not yet been set and the total number of bits that could be included in the combinatorial component of the ARC.

The process illustrated in FIG. 11 can begin when the computing device 100 is powered up like that of the process of FIGS. 9 and 10 discussed above. At the time that the computing device 100 was powered down, a baseline value for the ARC may have been written to the fuses of the one-time programmable memory 125. The processor of the secure processing subsystem 110 can access the one-time programmable memory 125, read the fuse map values from the one-time programmable memory 125, and store a representation of the fuse map in the volatile memory 120 of the secure processing subsystem 110 to generate the fuse map 1105. The process could start with a different static baseline or no static baseline value at all depending on whether the techniques discussed herein have been used yet to generate and maintain an ARC.

A new static baseline value can also be determined as discussed above with respect to FIGS. 9 and 10. The processor of the secure processing subsystem 110 can select at least one bit to add to the previous baseline as illustrated in fuse map 1110. The processor can select at least one bit from the available bits of the fuse map using the deterministic approach (in contrast with the approaches illustrated in FIGS. 9 and 10 in which the at least one bit added to the static baseline value may be randomly selected). The processor can be configured to blow the fuses associated with the one or more bits that have been selected in the one-time programmable memory 125 to establish a new static baseline value. The static baseline value stored in the one-time programmable memory 125 may initially start with no bits set.

Fuse map 1115 illustrates an example illustrated how the fuse map 1110 could change after data has been written to the external NVM 150 once following the updated static baseline being determined. In the example illustrated in fuse map 1115, the combinatorial portion of the ARC comprises one additional bit at this stage. The size ('X') of the combinatorial portion of the ARC grows in 1-bit increments once all of the combinations of bits comprising X bits has been exhausted. In the example illustrated in FIG. 11, the deterministic combinatorial algorithm increments from left to right and from bottom to top, but other implementation of the deterministic combinatorial algorithm can be configured to increment through the various permutations of X bit combinations in a different order than the one illustrated in FIG. 11. For example, the process illustrated in FIG. 11 can iterate through each of the possible combinations where the combinatorial selection component comprises 1-bit. Once the 1-bit options have been exhausted, the process can iterate through each of the 2-bit options until the 2-bit options have been exhausted. This process can continue, adding another bit as each of the series n-bit options are exhausted, until all possible combinations are exhausted or until the ARC value is written to the one-time programmable memory 125. The combinatorial selection portion of the ARC is not written to the fuses of the one-time programmable memory 125 until an event triggers the processor to write the current fuse map from the volatile memory 120 into the fuses comprising the one-time programmable memory 125. The monotonic selection portion is maintained only in the representation of the fuse map stored in the volatile memory 120 until such a write event occurs.

Fuse map 1120 illustrates an example illustrated how the fuse map 1110 could change after data has been written to the external NVM 150 numerous times following the state of the fuse map illustrated in fuse map 1115. In the example illustrated in fuse map 1125, all of the 1-bit options for the combinatorial portion of the ARC have been exhausted and the combinatorial algorithm is now iterating through 2-bit options, which will be used to determine the combinatorial portion of the ARC each time data is written to the external NVM 150. The 2-bit options will be explored until exhausted.

Fuse map 1125 illustrates an example illustrated how the fuse map 1110 could change after data has been written to the external NVM 150 numerous times following the state of the fuse map illustrated in fuse map 1120. In the example illustrated in fuse map 1125, all of the 1-bit and 2-bit options for the combinatorial portion of the ARC have been exhausted and the combinatorial algorithm is now iterating through 3-bit options, which will be used to determine the combinatorial portion of the ARC each time data is written to the external NVM 150. The 3-bit options will be explored until exhausted.

The processor then determines the power source has been depleted and/or determines that the physical intrusion sensor 212d has detected physical intrusion into the computing device 100. The processor then accesses the current fuse map in the volatile memory 120 and writes those values to the fuses of the one-time programmable memory 125 as the new static baseline value. In the example of FIG. 11, the fuse map in the volatile memory 120 was in the state illustrated by fuse map 1125. The fuses set in this map will become the new static baseline value that is written to the one-time programmable memory 125 by the processor as represented by fuse map 1130.

Figure 12:
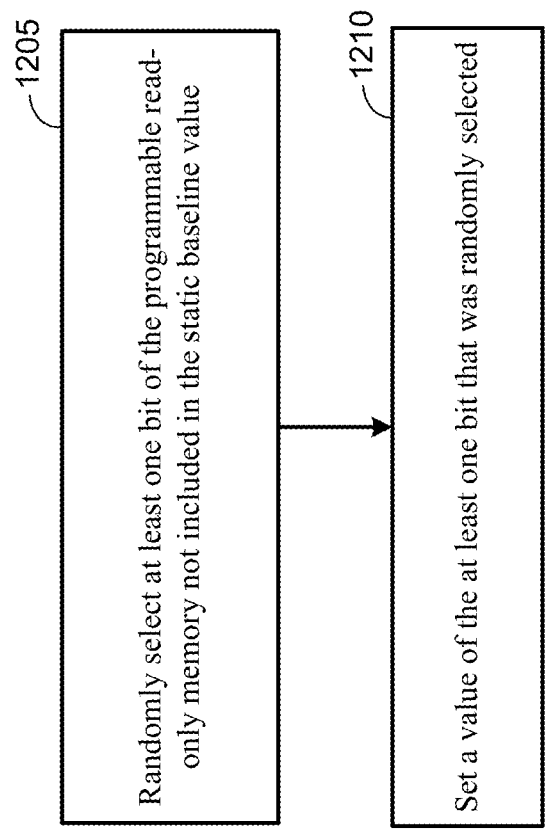
FIG. 12 is a flow diagram of an example process for determining a transient component of an anti-replay counter according to the techniques disclosed herein.

FIG. 12 is a flow diagram of an example process for determining a static baseline value of an anti-replay counter according to the techniques disclosed herein that can be used to implement at least in part the process illustrated in FIG. 6. For example, the process illustrated in FIG. 12 can be used to implement, at least in part, stage 610 of the process illustrated in FIG. 6. The process illustrated in FIG. 12 can be implemented by the processor of the secure processing subsystem 110 of the computing device 100 illustrated in FIGS. 1 and 2. The process illustrated in FIG. 12 can be used to generate the transient baseline value of an ARC. The example process illustrated in FIG. 9 can use the process of FIG. 12 to generate the static baseline value used therein.

At least one bit of the programmable read-only memory not included in the static baseline value can be randomly selected (stage 1205). The transient component of the ARC value 140 stored in the volatile memory 120 can be a set of one or more randomly selected bits from the fuse map representing the array of fuses comprising the fuses of the one-time programmable memory 125 that can be used to store the ARC values when the secure processing subsystem 110 responsive to a triggering event, such as those discussed above with respect to FIG. 1. The secure processing subsystem 110 can comprise a random number generator (RNG) that can be used to generate a value which can be used to determine which bits are selected.

A value of the at least one bit that was randomly selected can be set (stage 1210). A value indicating that the at least one bit that was randomly selected can be set in the ARC value 140 stored in the volatile memory 120. For example, the selected bits may be set to a value of '1' to indicate that they have been selected.

The process illustrated in FIG. 12 can be performed multiple times. The example illustrated in FIG. 9 illustrates this concept with the example fuse maps: fuse map 910, fuse map 915, fuse map 920, and fuse map 930, in which a new transient component of the ARC, representing by the squares having a background shaded with a diamond pattern indicates that the bit was set as part of a random selection. The examples of FIG. 9 are not intended to limit the process of FIG. 12 to the specific bits selected or the order in which they are selected. The process of FIG. 12 can repeat until an event occurs which triggers the secure processing subsystem 110 to write the current value of the ARC value 140 stored in the volatile memory 120 to the ARC value 165 stored in the one-time programmable memory 125. The number of bits selected at stage 1205 can change for each iteration, but at least one bit is selected at stage 1205.

Figure 13:
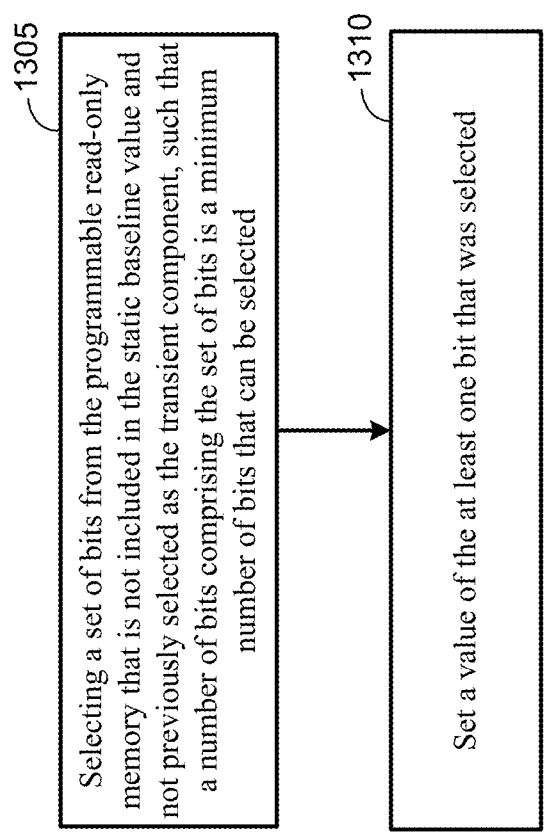
FIG. 13 is a flow diagram of an example process for determining a transient component of an anti-replay counter according to the techniques disclosed herein.

FIG. 13 is a flow diagram of an example process for determining a static baseline value of an anti-replay counter according to the techniques disclosed herein that can be used to implement at least in part the process illustrated in FIG. 6. For example, the process illustrated in FIG. 13 can be used to implement, at least in part, stage 610 of the process illustrated in FIG. 6. The process illustrated in FIG. 13 can be implemented by the processor of the secure processing subsystem 110 of the computing device 100 illustrated in FIGS. 1 and 2. The process illustrated in FIG. 13 can be used to generate the transient baseline value of an ARC. The example process illustrated in FIGS. 10-11 can use the process of FIG. 12 to generate the static baseline value used therein.

A set of bits from the programmable read-only memory that is not included in the static baseline value and not previously selected as the transient component can be selected, such that a number of bits comprising the set of bits is a minimum number of bits that can be selected (stage 1305). The techniques illustrated in FIGS. 10 and 11 use a combinatorial approach to minimize the number of bits that are selected for the transient component of the ARC each time that the ARC value is increment responsive to a triggering event, such as those discussed above with respect to FIG. 1. The processor of the secure processing subsystem 110 can be configured to iterate through each of the possible combinations where the transient component of the ARC comprises 1-bit. Once the 1-bit options have been exhausted, the processor can iterate through each of the 2-bit options until the 2-bit options have been exhausted. This process can continue, adding another bit as each of the series n-bit options are exhausted, until all possible combinations are exhausted or until the ARC value is written to the one-time programmable memory 125.

A value of the at least one bit that was randomly selected can be set (stage 1310). A value indicating that the at least one bit that was selected in stage 1305 can be set in the ARC value 140 stored in the volatile memory 120. For example, the selected bits may be set to a value of '1' to indicate that they have been selected.

The process illustrated in FIG. 13 can be performed multiple times. The example illustrated in FIG. 10 illustrates this concept with the example fuse maps: fuse map 1010, fuse map 1015, and fuse map 1020, and FIG. 11 illustrates this concept with the example fuse maps: fuse map 1110, fuse map 1115, fuse map 1120, and fuse map 1125, in which a new transient component of the ARC, representing by the squares having a background shaded with a diamond pattern indicates that the bit was set as part of a transient component of the ARC. The examples of FIGS. 10 and 11 are not intended to limit the process of FIG. 12 to the specific bits selected or the order in which they are selected. The process of FIG. 13 can repeat until an event occurs which triggers the secure processing subsystem 110 to write the current value of the ARC value 140 stored in the volatile memory 120 to the ARC value 165 stored in the one-time programmable memory 125. The number of bits selected at stage 1305 can increase over time as the each of the n-bit options are exhausted and the n+1-bit options are selected.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for providing data protection in an integrated circuit, the method comprising:
   determining a static baseline value based on a value stored in a programmable read-only memory of the integrated circuit;
   determining an anti-replay counter (ARC) value based on the static baseline value and a transient component;
   storing the ARC value in a volatile memory of the integrated circuit;
   redetermining the transient component of the ARC value stored in the volatile memory each time that data is to be written to off-chip, non-volatile memory by the integrated circuit; and
   updating the value stored in the programmable read-only memory of the integrated circuit based on the transient component of the ARC value stored in the volatile memory responsive to an event indicative that the contents of the volatile memory may be lost.

2. The method of claim 1, wherein the event indicative of the contents of the volatile memory may be lost is a power loss event.

3. The method of claim 2, wherein the power loss event comprises loss of power to the integrated circuit from an external power source or a signal from a sensor indicative that the external power source may be or is about to be removed.

4. A method for providing data protection in an integrated circuit, the method comprising:
   determining a static baseline value based on a value stored in a programmable read-only memory of the integrated circuit, wherein determining the static baseline value based on the ARC value stored in the programmable read-only memory comprises:
      accessing the value stored in the programmable read-only memory, the value being stored as a pattern of bits in the programmable read-only memory;
      selecting at least one bit from the programmable read-only memory that is not included in the pattern of bits;
      setting a value of the at least one bit selected in the programmable read-only memory; and
      determining the static baseline value based on the value stored in the programmable read-only memory and the at least one bit selected;
   determining an anti-replay counter (ARC) value based on the static baseline value and a transient component; and
   storing the ARC value in a volatile memory of the integrated circuit.

5. The method of claim 4, wherein selecting the at least one bit from the programmable read-only memory that is not included in the pattern of bits comprises randomly selecting the at least one bit.

6. The method of claim 4, further comprising determining the transient component, wherein determining the transient component comprises:
   randomly selecting at least one bit of the programmable read-only memory not included in the static baseline value; and
   setting a value of the at least one bit that was randomly selected.

7. The method of claim 4, further comprising determining the transient component, wherein determining the transient component comprises:
   selecting a set of bits from the programmable read-only memory that is not included in the static baseline value and not previously selected as the transient component, such that a number of bits comprising the set of bits is a minimum number of bits that can be selected; and
   setting a value of the at least one bit that was selected.

8. The method of claim 1, further comprising:
   computing a message authentication code (MAC) or a cryptographic signature on at least the data or a digest of the data to be written to the off-chip, non-volatile memory using at least part of the ARC value; and
   writing the data and the MAC to the off-chip, non-volatile memory.

9. An integrated circuit comprising:
   means for determining a static baseline value based on a value stored in a programmable read-only memory of the integrated circuit;
   means for determining an anti-replay counter (ARC) value based on the static baseline value and a transient component; and
   means for storing the ARC value in a volatile memory of the integrated circuit;
   means for redetermining the transient component of the ARC value stored in the volatile memory each time that data is to be written to off-chip, non-volatile memory by the integrated circuit; and
   means for updating the value stored in the programmable read-only memory of the integrated circuit based on the transient component of the ARC value stored in the volatile memory responsive to an event indicative that the contents of the volatile memory may be lost.

10. The integrated circuit of claim 9, further comprising:
    means for redetermining the transient component each time that data is to be written to off-chip, non-volatile memory by the integrated circuit.

11. The integrated circuit of claim 9, further comprising:
    means for updating the ARC value stored in the programmable read-only memory based on the ARC value in the volatile memory responsive to a power loss event.

12. The integrated circuit of claim 11, wherein the power loss event comprises loss of power to the integrated circuit from an external power source or a signal from a sensor indicative that the external power source may be or is about to be removed.

13. An integrated circuit comprising:
    means for determining a static baseline value based on a value stored in a programmable read-only memory of the integrated circuit, wherein the means for determining the static baseline value based on the ARC value stored in the programmable read-only memory comprises:
       means for accessing the value stored in the programmable read-only memory, the ARC value being stored as a pattern of bits in the programmable read-only memory;
       means for selecting at least one bit from the programmable read-only memory that is not included in the pattern of bits;
       means for setting a value of the at least one bit selected in the programmable read-only memory; and
       means for determining the static baseline value based on the value stored in the programmable read-only memory and the at least one bit selected;
    means for determining an anti-replay counter (ARC) value based on the static baseline value and a transient component; and
    means for storing the ARC value in a volatile memory of the integrated circuit.

14. The integrated circuit of claim 13, wherein the means for selecting the at least one bit from the programmable read-only memory that is not included in the pattern of bits comprises means for randomly selecting the at least one bit.

15. The integrated circuit of claim 13, further comprising means for determining the transient component, wherein the means for determining the transient component comprises:
    means for randomly selecting at least one bit of the programmable read-only memory not included in the static baseline value; and
    means for setting a value of the at least one bit that was randomly selected.

16. The integrated circuit of claim 13, further comprising means for determining the transient component, wherein the means for determining the transient component comprises:
    means for selecting a set of bits from the programmable read-only memory that is not included in the static baseline value and not previously selected as the transient component, such that a number of bits comprising the set of bits is a minimum number of bits that can be selected; and
    means for setting a value of the at least one bit that was selected.

17. The integrated circuit of claim 9, further comprising:
    means for computing a message authentication code (MAC) or a cryptographic signature on at least the data or a digest of the data to be written to the off-chip, non-volatile memory using at least part of the ARC value; and
    means for writing the data and the MAC to the off-chip, non-volatile memory.

18. An integrated circuit comprising:
    a volatile memory;
    a programmable read-only memory;
    a processor coupled to the volatile memory and the programmable read-only memory, the processor configured to:
       determine a static baseline value based on a value stored in a programmable read-only memory of the integrated circuit;
       determine an anti-replay counter (ARC) value based on the static baseline value and a transient component;
       store the ARC value in a volatile memory of the integrated circuit;
       redetermine the transient component of the ARC value stored in the volatile memory each time that data is to be written to off-chip, non-volatile memory by the integrated circuit; and
       update the value stored in the programmable read-only memory of the integrated circuit based on the transient component of the ARC value stored in the volatile memory responsive to an event indicative that the contents of the volatile memory may be lost.

19. The integrated circuit of claim 18,
wherein the event indicative of the contents of the volatile memory may be lost is a power loss event.

20. The integrated circuit of claim 19, wherein the power loss event comprises loss of power to the integrated circuit from an external power source or a signal from a sensor indicative that the external power source may be or is about to be removed.

21. An integrated circuit comprising:
a volatile memory;
a programmable read-only memory;
a processor coupled to the volatile memory and the programmable read-only memory, the processor configured to:
determine a static baseline value based on a value stored in a programmable read-only memory of the integrated circuit, wherein the processor being configured to determine the static baseline value based on the ARC value stored in the programmable read-only memory is further configured to:
access the ARC value stored in the programmable read-only memory, the ARC value being stored as a pattern of bits in the programmable read-only memory;
select at least one bit from the programmable read-only memory that is not included in the pattern of bits;
set a value of the at least one bit selected in the programmable read-only memory; and
determine the static baseline value based on the ARC value stored in the programmable read-only memory and the at least one bit selected;
determine an anti-replay counter (ARC) value based on the static baseline value and a transient component, the transient component comprising a value that is redetermined each time that the ARC value is required and is not stored in the programmable read-only memory of the integrated circuit; and
store the ARC value in a volatile memory of the integrated circuit.

22. The integrated circuit of claim 21, wherein the processor being configured to select the at least one bit from the programmable read-only memory that is not included in the pattern of bits is configured to randomly select the at least one bit.

23. The integrated circuit of claim 21, wherein the processor is further configured to determine the transient component, wherein the processor is configured to:
randomly select at least one bit of the programmable read-only memory not included in the static baseline value; and
set a value of the at least one bit that was randomly selected.

24. The integrated circuit of claim 21, wherein the processor is further configured to determine the transient component, wherein the processor is configured to:
select a set of bits from the programmable read-only memory that is not included in the static baseline value and not previously selected as the transient component, such that a number of bits comprising the set of bits is a minimum number of bits that can be selected; and
set a value of the at least one bit that was selected.

25. The integrated circuit of claim 18, wherein the processor is further configured to:
compute a message authentication code (MAC) or a cryptographic signature on at least the data or a digest of the data to be written to the off-chip, non-volatile memory using at least part of the ARC value; and
write the data and the MAC to the off-chip, non-volatile memory.

26. An non-transitory, computer-readable medium, having stored thereon computer-readable instructions for providing data protection in an integrated circuit, comprising instructions configured to cause the integrated circuit to:
determine a static baseline value based on a value stored in a programmable read-only memory of the integrated circuit;
determine an anti-replay counter (ARC) value based on the static baseline value and a transient component, the transient component comprising a value that is redetermined each time that the ARC value is required and is not stored in the programmable read-only memory of the integrated circuit; and
store the ARC value in a volatile memory of the integrated circuit.

27. The non-transitory, computer-readable medium of claim 26,
wherein the event indicative of the contents of the volatile memory may be lost is a power loss event.

* * * * *